United States Patent
Abdelghaffar et al.

(10) Patent No.: US 12,308,914 B2
(45) Date of Patent: May 20, 2025

(54) CHANNEL RECIPROCITY FOR A MULTI-PANEL BASE STATION

(71) Applicant: QUALCOMM Incorporated, San Diego, CA (US)

(72) Inventors: Muhammad Sayed Khairy Abdelghaffar, San Jose, CA (US); Wanshi Chen, San Diego, CA (US); Tingfang Ji, San Diego, CA (US); Alexandros Manolakos, Escondido, CA (US); Huilin Xu, Temecula, CA (US); Krishna Kiran Mukkavilli, San Diego, CA (US); Ahmed Attia Abotabl, San Diego, CA (US); Gokul Sridharan, Sunnyvale, CA (US); Abdelrahman Mohamed Ahmed Mohamed Ibrahim, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 18/006,857

(22) PCT Filed: Sep. 14, 2021

(86) PCT No.: PCT/US2021/050304
§ 371 (c)(1),
(2) Date: Jan. 25, 2023

(87) PCT Pub. No.: WO2022/056480
PCT Pub. Date: Mar. 17, 2022

(65) Prior Publication Data
US 2023/0275631 A1 Aug. 31, 2023

(30) Foreign Application Priority Data
Sep. 14, 2020 (GR) .............................. 20200100557

(51) Int. Cl.
*H04B 7/06* (2006.01)

(52) U.S. Cl.
CPC .................................. *H04B 7/0615* (2013.01)

(58) Field of Classification Search
CPC .... H04B 7/0615; H04B 7/022; H04B 7/0617; H04B 7/0862; H04B 7/0874; H04B 7/0691; H04L 5/0023; H04L 5/0048
See application file for complete search history.

(56) References Cited

U.S. PATENT DOCUMENTS

| | | | |
|---|---|---|---|
| 2020/0145062 A1* | 5/2020 | Jung | H04W 72/23 |
| 2021/0051710 A1* | 2/2021 | Cirik | H04L 5/0053 |

(Continued)

FOREIGN PATENT DOCUMENTS

| | | | | |
|---|---|---|---|---|
| EP | 3602835 B1 * | 3/2021 | | H04B 7/0417 |
| WO | 2020019317 A1 | 1/2020 | | |
| WO | 2020067449 A1 | 4/2020 | | |

OTHER PUBLICATIONS

Machine translation of CN-113169781-A (Year: 2021).*

(Continued)

*Primary Examiner* — Jean B Corrielus
(74) *Attorney, Agent, or Firm* — Loza & Loza, LLP

(57) ABSTRACT

Aspects of the disclosure relate to communication using a multi-panel base station. In an aspect, a base station may determine a plurality of indicators identifying a plurality of antenna panels on the base station, wherein each indicator of the plurality of indicators identifies a respective antenna panel of the plurality of antenna panels. Further, the base station may transmit the plurality of indicators to a user equipment (UE) to respectively identify the plurality of antenna panels.

28 Claims, 18 Drawing Sheets

(56) References Cited

U.S. PATENT DOCUMENTS

| | | | |
|---|---|---|---|
| 2021/0168714 A1* | 6/2021 | Guan | H04W 52/16 |
| 2021/0184748 A1* | 6/2021 | Luo | H04W 52/143 |
| 2021/0211957 A1 | 7/2021 | Kamohara et al. | |
| 2021/0281301 A1* | 9/2021 | Takano | H04B 7/0695 |
| 2022/0030620 A1* | 1/2022 | Cirik | H04B 7/088 |
| 2022/0123818 A1 | 4/2022 | Li | |
| 2022/0167274 A1* | 5/2022 | Wang | H04L 5/0064 |

OTHER PUBLICATIONS

Machine translation of CN-111656696-A (Year: 2020).*
Machine translation of JP-2022521595-A (Year: 2022).*
International Search Report and Written Opinion—PCT/US2021/050304—ISA/EPO—Jan. 5, 2022.
Mitsubishi Electric: "Views on Multi-Panel/TRP MIMO Transmission", 3GPP TSG RAN WG1 Meeting #94b, 3GPP Draft, R1-1811483-RAN1 94B_Multi Panel_A, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8-Oct. 12, 2018, Sep. 28, 2018 (Sep. 28, 2018), 6 Pages, XP051518886, Section 2 Figure 2.

* cited by examiner

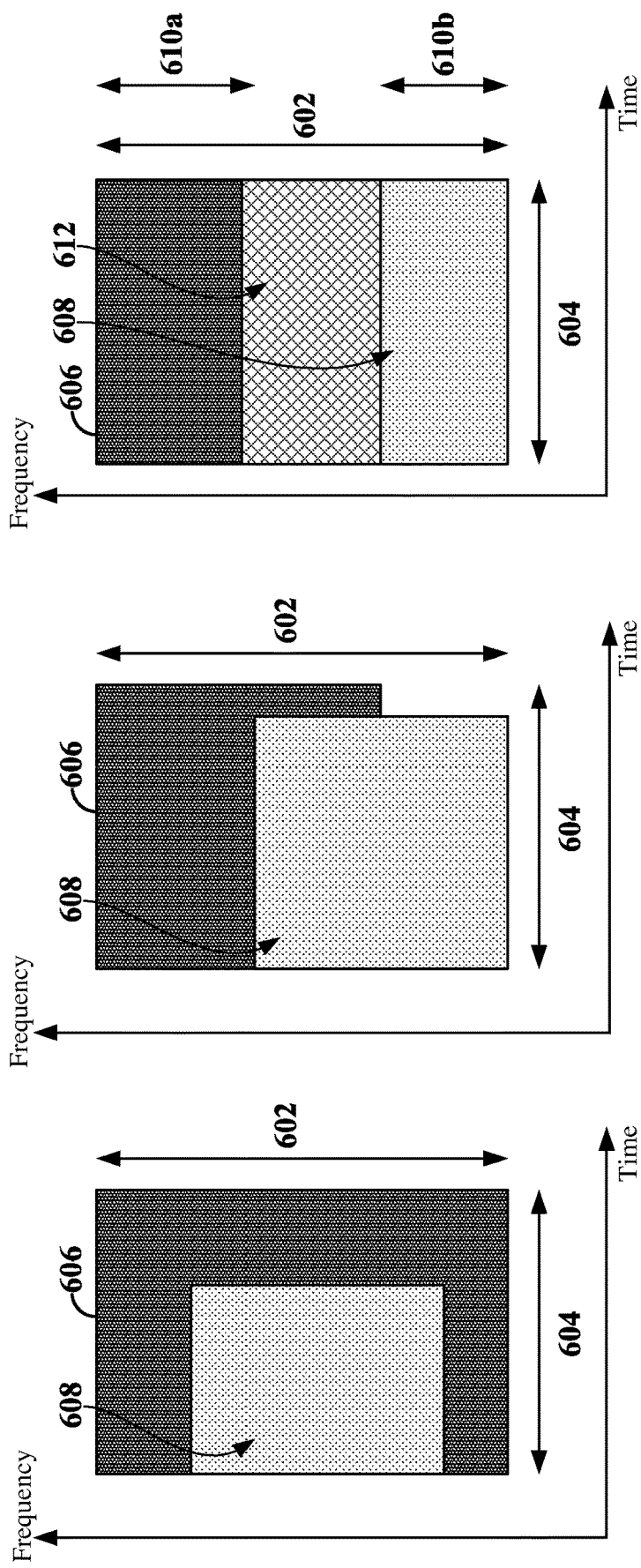

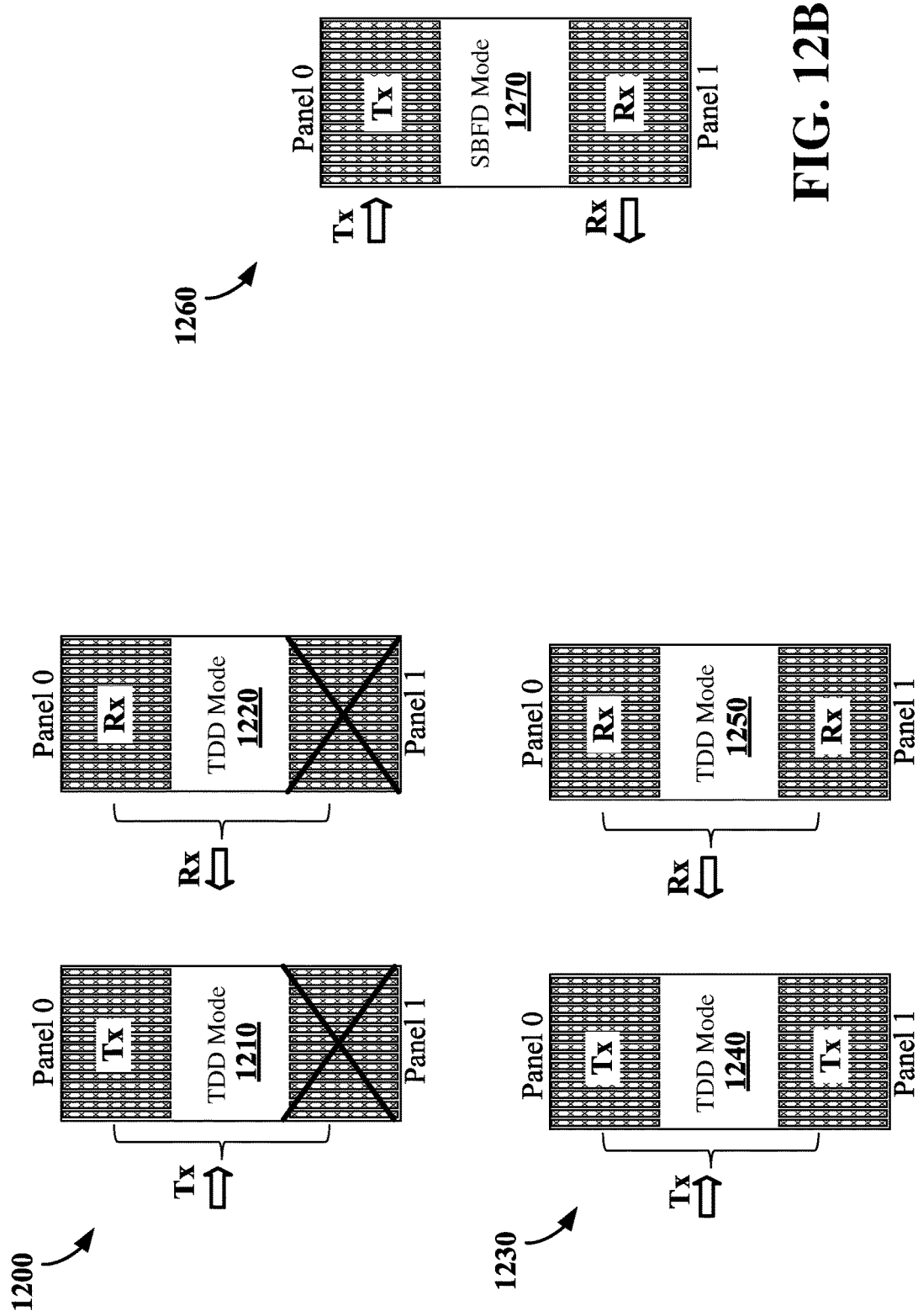

CHANNEL RECIPROCITY FOR A MULTI-PANEL BASE STATION

PRIORITY CLAIM

This application is the U.S. national stage of PCT patent application number PCT/US21/50304 filed on Sep. 14, 2021. Application No. PCT/US21/50304 claims priority to and the benefit of patent application No. 20200100557 filed in the Greek Patent and Trademark Office on Sep. 14, 2020, the entire content of which is incorporated herein by reference as if fully set forth below in its entirety and for all applicable purposes.

TECHNICAL FIELD

The technology discussed below relates generally to wireless communication networks, and more particularly, to a communication using a multi-panel base station.

INTRODUCTION

In wireless communication systems, such as those specified under standards for 5G New Radio (NR), an access point (e.g., a base station) may communicate with a user equipment (UE) (e.g., a smartphone). The communication can utilize various duplexing modes. For example, each of the base station (e.g., gNodeB (gNB)) and the UE can operate in a half-duplex mode or a full-duplex mode. In half-duplex mode, downlink and uplink transmissions occur at different times. In some examples, half-duplex communication may utilize time division duplex (TDD) in which transmissions in different directions on a given channel are separated from one another using time division multiplexing. In full-duplex mode, downlink and uplink transmissions may occur simultaneously. In some examples, full-duplex communication may utilize frequency division duplex (FDD) in paired spectrum, in which transmissions in different directions occur at different carrier frequencies. In other examples, full-duplex communication may utilize sub-band FDD in unpaired spectrum, in which the transmissions in different directions are carried in different sub-bands of a carrier bandwidth (or a BWP of the carrier bandwidth).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure relate to communication using a multi-panel base station. The multi-panel base station may indicate to the UE that the multi-panel base station has multiple antenna panels, e.g., by providing indicators respectively indicating the multiple antenna panels. As such, the UE may be aware of the antenna panels of the base station, and thus may adjust its communication configurations depending on which antenna panel of the base station is communicating with the UE.

In one example, a method of wireless communication by a base station is disclosed. The method includes transmitting a plurality of indicators identifying a plurality of antenna panels on the base station to a user equipment (UE), wherein each indicator of the plurality of indicators identifies a respective panel of the plurality of antenna panels, and communicating with the UE based on the plurality of indicators of the plurality of antenna panels.

In another example, a base station for wireless communication is disclosed. The base station includes at least one processor, a transceiver communicatively coupled to the at least one processor, and a memory communicatively coupled to the at least one processor. The at least one processor may be configured to transmit a plurality of indicators identifying a plurality of antenna panels on the base station to a user equipment (UE), wherein each indicator of the plurality of indicators identifies a respective panel of the plurality of antenna panels, and communicate with the UE based on the plurality of indicators of the plurality of antenna panels.

In another example, a non-transitory processor-readable storage medium having instructions for a base station thereon may be disclosed. The instructions, when executed by a processing circuit, cause the processing circuit to transmit a plurality of indicators identifying a plurality of antenna panels on the base station to a user equipment (UE), wherein each indicator of the plurality of indicators identifies a respective panel of the plurality of antenna panels, and communicate with the UE based on the plurality of indicators of the plurality of antenna panels.

In a further example, a base station for wireless communication may be disclosed. The base station includes means for transmitting a plurality of indicators identifying a plurality of antenna panels on the base station to a user equipment (UE), wherein each indicator of the plurality of indicators identifies a respective panel of the plurality of antenna panels, and means for communicating with the UE based on the plurality of indicators of the plurality of antenna panels.

In one example, a method of wireless communication by a UE is disclosed. The method includes receiving, from a base station configured to communicate via a plurality of antenna panels, a plurality of indicators to respectively identify the plurality of antenna panels, and transmitting a plurality of sounding reference signals (SRSs) respectively to a plurality of antenna panels of the base station based on the plurality of indicators.

In another example, a UE for wireless communication is disclosed. The UE includes at least one processor, a transceiver communicatively coupled to the at least one processor, and a memory communicatively coupled to the at least one processor. The at least one processor may be configured to receive, from a base station configured to communicate via a plurality of antenna panels, a plurality of indicators to respectively identify the plurality of antenna panels, and transmit a plurality of sounding reference signals (SRSs) respectively to a plurality of antenna panels of the base station based on the plurality of indicators.

In another example, a non-transitory processor-readable storage medium having instructions for UE thereon may be disclosed. The instructions, when executed by a processing circuit, cause the processing circuit to receive, from a base station configured to communicate via a plurality of antenna panels, a plurality of indicators to respectively identify the plurality of antenna panels, and transmit a plurality of sounding reference signals (SRSs) respectively to a plurality of antenna panels of the base station based on the plurality of indicators.

In a further example, a UE for wireless communication may be disclosed. The UE includes means for receiving, from a base station configured to communicate via a plurality of antenna panels, a plurality of indicators to respectively identify the plurality of antenna panels, and means for transmitting a plurality of SRSs respectively to a plurality of antenna panels of the base station based on the plurality of indicators.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIGS. 6A-6C illustrate examples of full-duplex communication in unpaired spectrum according to some aspects.

FIG. 12A shows two example diagrams that illustrate the base station in a TDD mode, according to some aspects of the disclosure.

FIG. 12B shows an example diagram illustrating the base station in a frequency division duplex (FDD) mode, according to some aspects of the disclosure.

DETAILED DESCRIPTION

Figure 1:
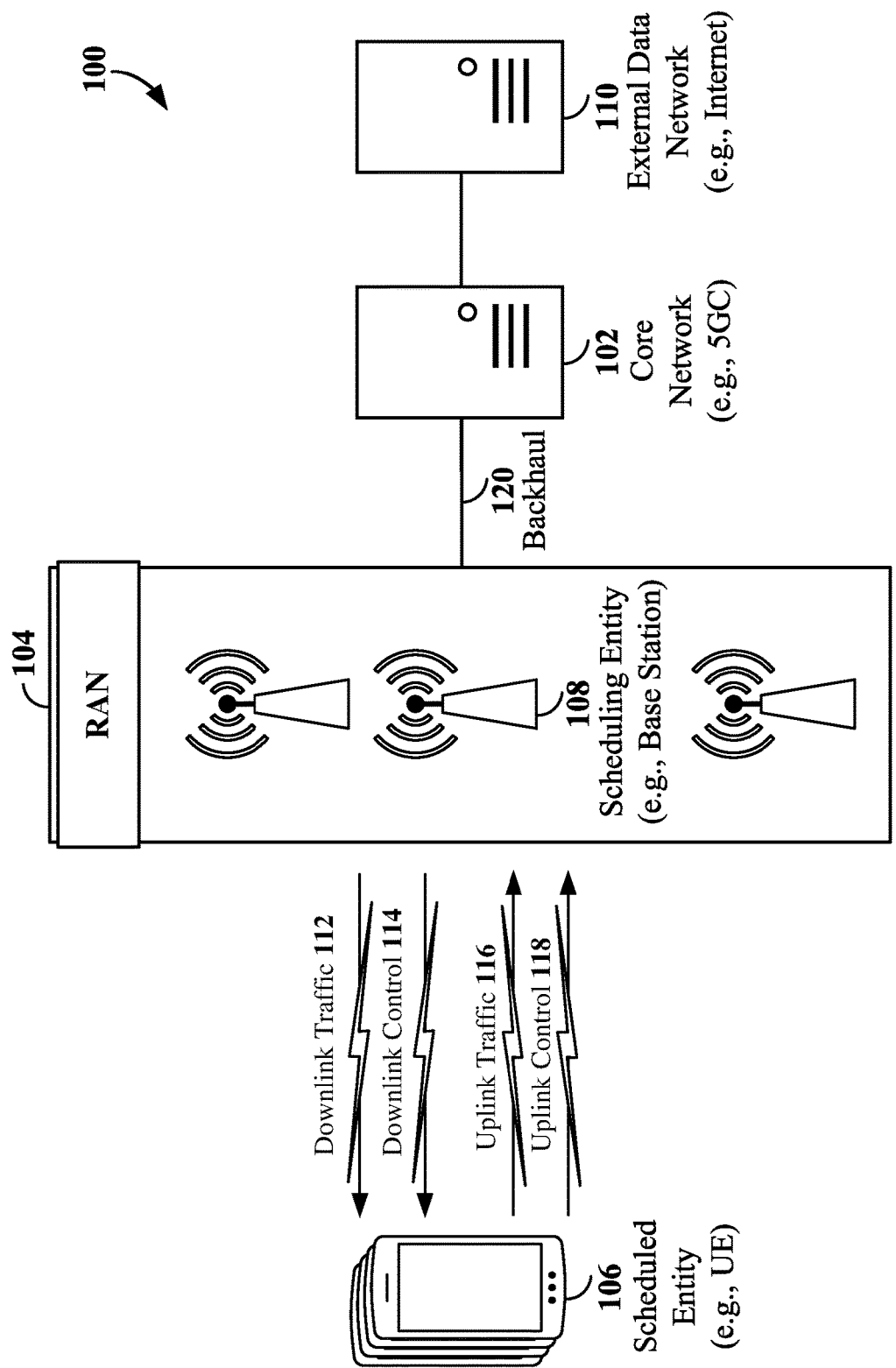
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.126 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2x (52.6 GHz-71 GHz), FR4 (71 GHz-114.25 GHz), and FR5 (114.25 GHz-275 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR2x, FR4, and/or FR5, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna array modules, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
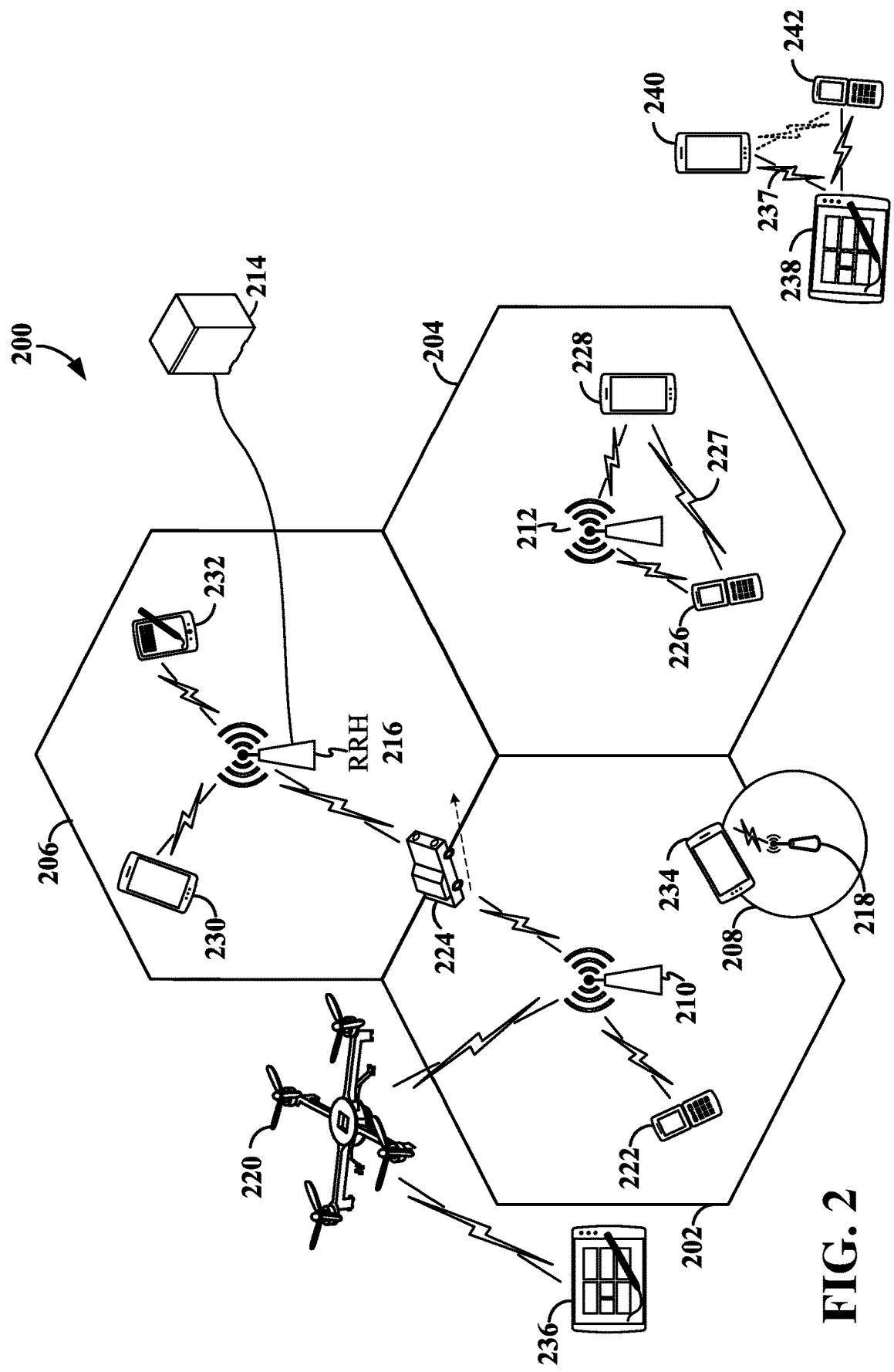
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE.

For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the RAN 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities and scheduled entities may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD). In FDD, transmissions in different directions may operate at different carrier frequencies (e.g., within paired spectrum). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), sub-band FDD, or flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
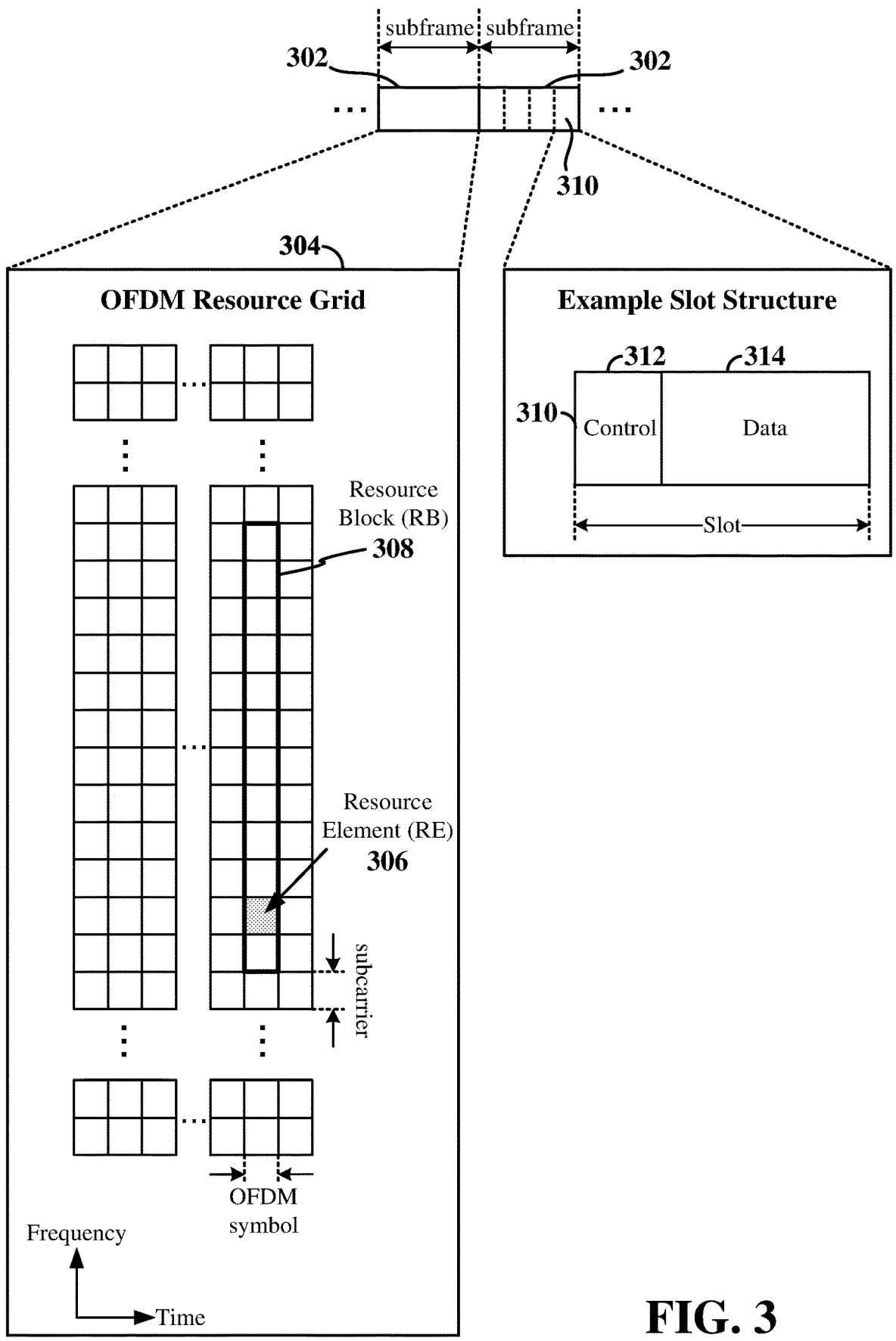
FIG. 3 is a diagram illustrating an example of a frame structure for use in a wireless communication network according to some aspects.

Referring now to FIG. 3, an expanded view of an exemplary DL subframe 302 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs (scheduled entities) for downlink or uplink transmissions typically involves scheduling one or more resource elements 306 within one or more sub-bands or bandwidth parts (BWPs). Thus, a UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), channel state information-reference signal (CSI-RS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the base station may allocate one or more REs 306 (e.g., within a control region 312) to carry DL control information including one or more DL control channels, such as a physical hybrid automatic repeat request (HARQ) indicator channel (PHICH), a physical downlink control channel (PDCCH), etc., to one or more scheduled entities. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 to carry other DL signals, such as a DMRS; a phase-tracking reference signal (PT-RS); a CSI-RS; a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, a list of common search spaces, a paging search space, downlink configuration information, and uplink configuration information. The MIB and SIB1 together provide the minimum system information (SI) for initial access.

In an UL transmission, the UE may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry SIBs (e.g., SIB1), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
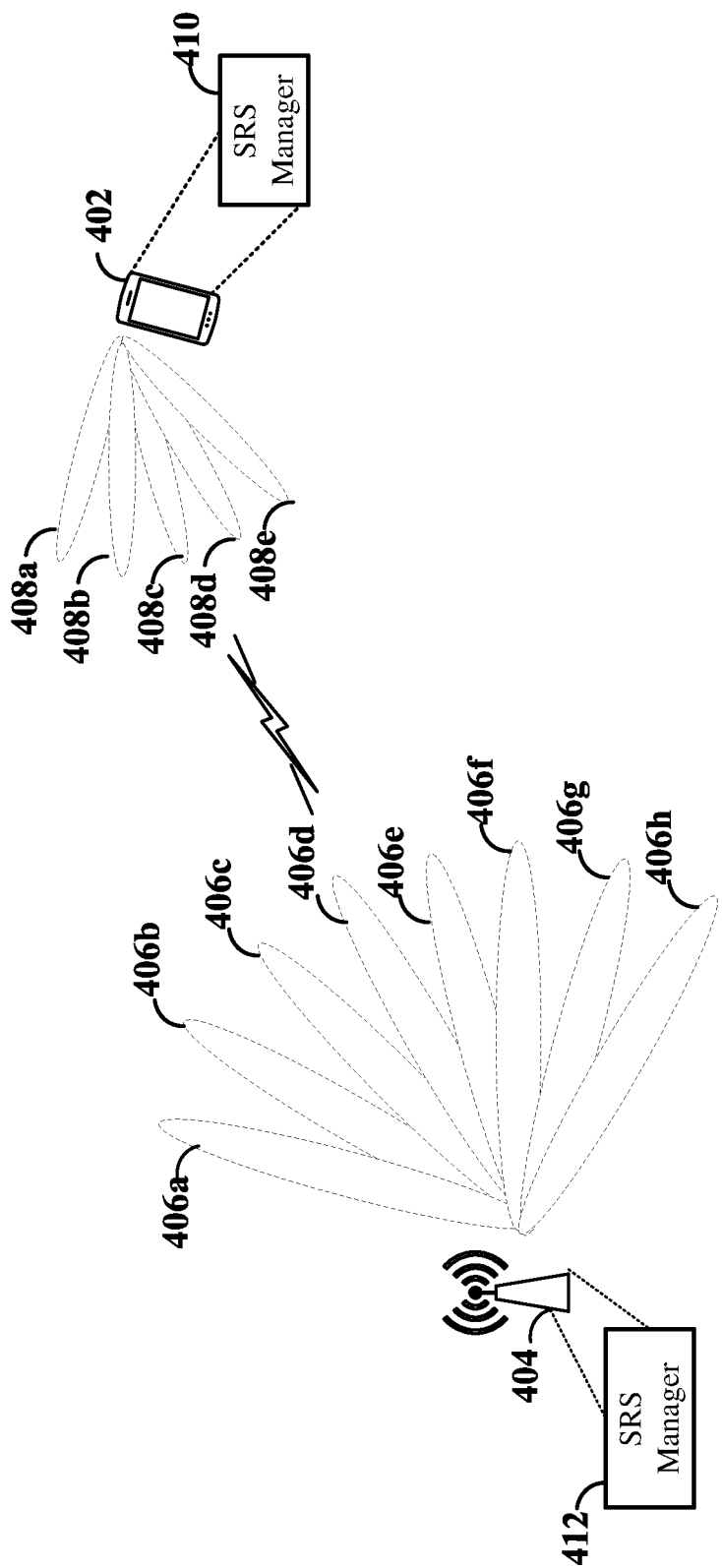
FIG. 4 is a diagram illustrating an example of communication between a base station and a UE using beamforming according to some aspects.

FIG. 4 is a diagram illustrating communication between a base station 404 and a UE 402 using beamformed signals according to some aspects. The base station 404 may be any of the base stations (e.g., gNBs) or scheduling entities illustrated in FIGS. 1 and/or 2, and the UE 402 may be any of the UEs or scheduled entities illustrated in FIGS. 1 and/or 2.

Beamforming is a signal processing technique that may be used at the transmitter or receiver to shape or steer an antenna beam (e.g., a transmit beam or receive beam) along a spatial path between the transmitter and the receiver. Beamforming may be achieved by combining the signals communicated via a set of antennas (e.g., antenna elements of an antenna array) such that some of the signals experience constructive interference while others experience destructive interference. To create the desired constructive/destructive interference, the transmitter or receiver may apply amplitude and/or phase offsets to signals transmitted or received from the set of antennas.

FIG. 4 is a diagram illustrating communication between a base station 404 and a UE 402 using beamformed signals according to some aspects. The base station 404 may be any of the base stations (e.g., gNBs) or scheduling entities illustrated in FIGS. 1 and/or 3, and the UE 402 may be any of the UEs or scheduled entities illustrated in FIGS. 1 and/or 3.

The base station 404 may generally be capable of communicating with the UE 402 using one or more transmit beams, and the UE 402 may further be capable of communicating with the base station 404 using one or more receive beams. As used herein, the term transmit beam refers to a beam on the base station 404 that may be utilized for downlink or uplink communication with the UE 402. In addition, the term receive beam refers to a beam on the UE 402 that may be utilized for downlink or uplink communication with the base station 404.

In the example shown in FIG. 4, the base station 404 is configured to generate a plurality of transmit beams 406a-406h. One or more of the transmit beams can be associated with a different spatial direction in some scenarios. In addition or alternatively, the UE 402 may be configured to generate a plurality of receive beams 408a-408e, each associated with a different spatial direction. It should be noted that while some beams are illustrated as adjacent to one another, such an arrangement may be different in different aspects. For example, transmit beams 406a-406h transmitted during a same symbol may not be adjacent to one another. In some examples, the base station 404 and UE 402 may each transmit more or less beams distributed in all directions (e.g., 350 degrees) and in three-dimensions. In addition, the transmit beams 406a-406h may include beams of varying beam width. For example, the base station 404 may transmit certain signals (e.g., SSBs) on wider beams and other signals (e.g., CSI-RSs) on narrower beams.

The base station 404 and UE 402 may select one or more transmit beams 406a-406h on the base station 404 and one or more receive beams 408a-408e on the UE 402 for communication. Beam selection can occur using uplink and downlink signals between the BS and UE using a beam management procedure. In one example, during initial cell acquisition, the UE 402 may perform a P1 beam management procedure. The P1 beam management procedure can include scanning one or more of the plurality of transmit beams 406a-406h on the plurality of receive beams 408a-408e to select a beam pair link (e.g., one of the transmit beams 406a-406h. The P1 procedure may also include selecting one or more of the receive beams 408a-408e) for a physical random access channel (PRACH) procedure for initial access to the cell. For example, periodic SSB beam sweeping may be implemented on the base station 404 at certain intervals (e.g., based on the SSB periodicity, which may be, for example 20 ms). Thus, the base station 404 may be configured to sweep or transmit an SSB on each of a plurality of wider transmit beams 406a-406h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the P1 beam management and/or PRACH procedure, the base station 404 and UE 402 may perform a P2 beam management procedure. A P2 beam management procedure can aid in beam refinement at the base station 404. For example, the base station 404 may be configured to sweep or transmit a CSI-RS on each of a plurality of narrower transmit beams 406a-406h. Each of the narrower CSI-RS beams may be a sub-beam of the selected SSB transmit beam and/or other SSB transmit beams (e.g., within the spatial direction of one or more SSB transmit beams). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 402 is configured to scan the plurality of CSI-RS transmit beams 406a-406h on the plurality of receive beams 408a-408e. The UE 402 then performs beam measurements (e.g., RSRP, SINR, etc.) of the received CSI-RSs on each of the receive beams 408a-408e to determine the respective beam quality of each of the CSI-RS transmit beams 406a-406h as measured on each of the receive beams 408a-408e.

The UE 402 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 406a-406h on one or more of the receive beams 408a-408e to the base station 404. The base station 404 may then select one or more CSI-RS transmit beams on which to communicate downlink and/or uplink control and/or data with the UE 402. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 402 may further select a corresponding receive beam on the UE 402 for each selected serving CSI-RS transmit beam to form a respective beam pair link (BPL) for each selected serving CSI-RS transmit beam. For example, the UE 402 can utilize the beam measurements obtained during the P2 procedure or perform a P3 beam management procedure (e.g., beam refinement procedure) to perform a UE beam scan to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 404 may configure the UE 402 to perform SSB beam measurements. For example, the base station 404 may configure the UE 402 to perform SSB beam measurements and/or CSI-RS beam measurements for beam failure detection (BFD), beam failure recovery (BFR), cell reselection, beam refinement (e.g., a P3 procedure), beam tracking (e.g., for a mobile UE 402 and/or base station 404), or other beam optimization purpose.

In addition, when the channel is reciprocal, the transmit and receive beams may be selected using an uplink beam management scheme. In an example, the UE 402 may be configured to sweep or transmit on each of a plurality of receive beams 408a-408e. For example, the UE 402 may transmit an SRS on each beam in the different beam directions. In addition, the base station 404 may be configured to receive the uplink beam reference signals on a plurality of transmit beams 406a-406h. The base station 404 then performs beam measurements (e.g., RSRP, SINR, etc.) of the beam reference signals on each of the transmit beams 406a-406h to determine the respective beam quality of each of the receive beams 408a-408e as measured on each of the transmit beams 406a-406h.

The base station 404 may then select one or more transmit beams on which to communicate downlink and/or uplink control and/or data with the UE 402. In some examples, the selected transmit beam(s) have the highest RSRP. The UE 402 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 406d) on the base station 404 and a single receive beam (e.g., beam 408c) on the UE may form a single BPL used for communication between the base station 404 and the UE 402. In another example, multiple CSI-RS transmit beams (e.g., beams 406c, 406d, and 406e) on the base station 404 and a single receive beam (e.g., beam 408c) on the UE 402 may form respective BPLs used for communication between the base station 404 and the UE 402. In another example, multiple CSI-RS transmit beams (e.g., beams 406c, 406d, and 406e) on the base station 404 and multiple receive beams (e.g., beams 408c and 408d) on the UE 402 may form multiple BPLs used for communication between the base station 404 and the UE 402. In this example, a first BPL may include transmit beam 406c and receive beam 408c, a second BPL may include transmit beam 408d and receive beam 408c, and a third BPL may include transmit beam 408e and receive beam 408d.

Figure 5:
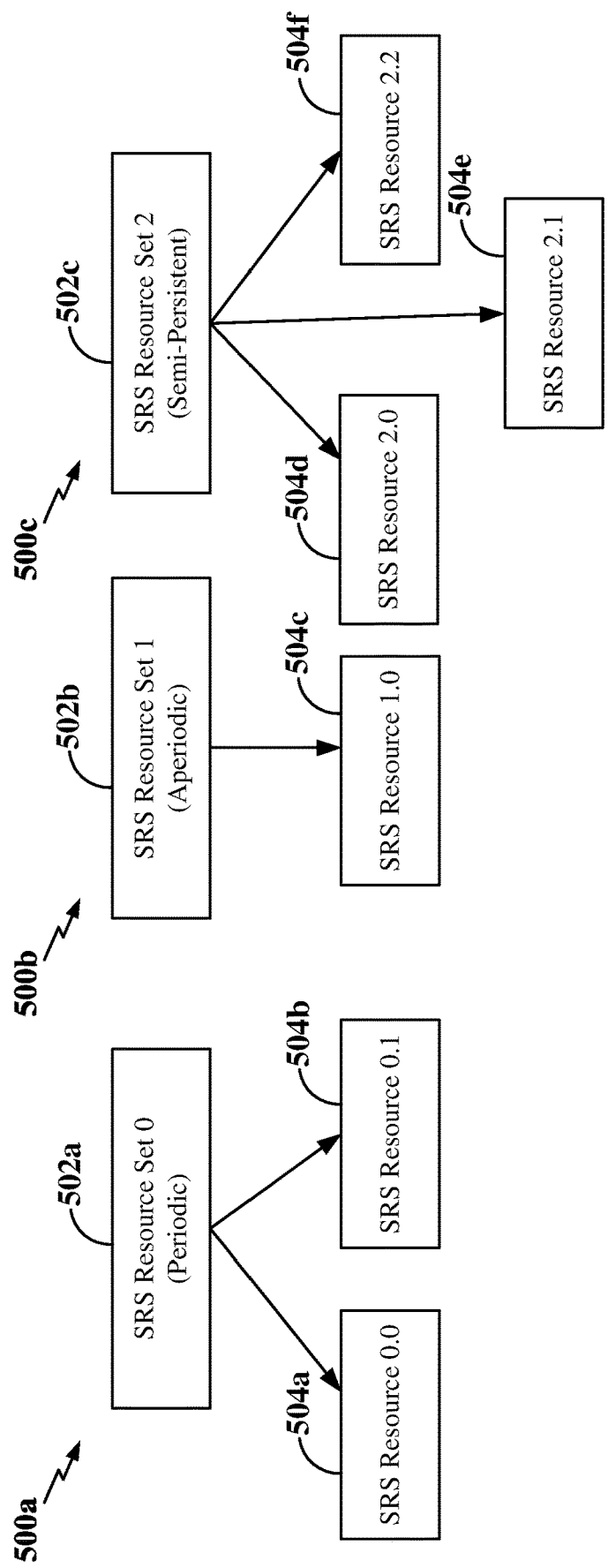
FIG. 5 is a diagram illustrating exemplary sounding reference signal (SRS) configurations for SRS resource sets.

FIG. 5 is a diagram illustrating exemplary SRS configurations 500a-500c for SRS resource sets 502a-502c, each including SRS resources 504a-504f according to some aspects. An SRS resource set may include one or more SRS resources. For example, SRS resource set 502a (SRS Resource Set 0) includes SRS resources 504a and 504b (SRS Resource 0.0 and SRS Resource 0.1), SRS resource set 502b (SRS Resource Set 1) includes SRS resource 504c (SRS Resource 1.0), and SRS resource set 502c (SRS Resource Set 2) includes SRS resource sets 504d, 504e, and 504f (SRS Resource 2.0, SRS Resource 2.1, and SRS Resource 2.2).

As indicated in FIG. 5, multiple SRS resource sets 502a-502c may be configured for a UE. In addition, each SRS resource set 502a-502c may be configured to be periodic, aperiodic, or semi-persistent, such that each of the SRS resources within the corresponding SRS resource set are periodic, aperiodic, or semi-persistent, respectively. For example, the SRS resources 504a and 504b within SRS resource set 502a may be periodic SRS resources, the SRS resource 504c within SRS resource set 502b may be aperiodic SRS resources, and the SRS resources 504d-504f within SRS resource set 502c may be semi-persistent SRS resources.

Each SRS resource 504a-504f includes a set of SRS resource parameters configuring the SRS resource. For example, the SRS resource parameters may include a set of port(s) (e.g., uplink beam), number of consecutive symbols, time domain allocation, repetition, transmission comb structure, bandwidth, and other suitable parameters. Each SRS may further be quasi co-located (QCL'ed) with another reference signal, such as an SSB, CSI-RS, or another SRS. Thus, based on the QCL association (e.g., with an SSB beam, CSI-RS beam, or SRS beam), the SRS resource may be transmitted with the same spatial domain filter utilized for reception/transmission of the indicated reference signal (e.g., SSB beam, CSI-RS beam, or SRS beam).

The respective sets of SRS resource parameters for each of the SRS resources in a particular SRS resource set collectively form the SRS resource set parameters for the SRS resource set. In addition, the SRS resource set itself may further include additional SRS resource set parameters. For example, the SRS resource set parameters for the aperiodic SRS resource set 502b may further include an aperiodic trigger state (e.g., codepoint) for the aperiodic SRS resource set 502b (e.g., up to three trigger states may be possible, each mapping to an aperiodic SRS resource set), a slot offset between the slot including the DCI triggering the aperiodic SRS resource and transmission of the SRS (e.g., SRS is transmitted k slot(s) after the slot carrying the DCI containing the trigger state), and a CSI-RS resource identifier (CRI) associated with the aperiodic SRS resource set 502*b* for precoder estimation of the aperiodic SRSs. As another example, the SRS configuration for a periodic SRS resource set 502*a* or semi-persistent SRS resource set 502*c* may indicate the periodicity of the SRS resources (e.g., the periodicity of transmission of SRSs). The respective SRS resource set parameters then collectively form the SRS configuration 500*a*-500*c* of the corresponding SRS resource set 502*a*-502*c*.

Generally speaking, two signals transmitted from the same antenna port should experience the same radio channel, whereas transmitting signals from two different antenna ports should experience different radio conditions. In some cases, transmitted signals from two different antenna ports experience radio channels having common properties. In such cases, the antenna ports are said to be in QCL. Two antenna ports may be considered quasi co-located if properties of the channel over which a symbol on one antenna port is conveyed can be inferred from the channel over which a symbol on the other antenna port is conveyed. In 5G NR, UE are equipped with channel estimation, frequency offset error estimation and synchronization procedures for processing QCL. For example, if UE knows that the radio channels corresponding to two different antenna ports is QCL in terms of Doppler shift, then the UE can determine the Doppler shift for one antenna port and then apply the result on both antenna ports for channel estimation. This avoids the UE having to calculate Doppler shift for both antenna ports separately.

Four types of QCL are defined in 5G NR: QCL-TypeA; QCL-TypeB; QCL-TypeC; and QCL-TypeD. For example, QCL-TypeA may indicate a downlink reference signal (e.g., SSB or CSI-RS) or uplink reference signal (e.g., SRS) from which the large-scale channel properties (LSCPs), such as Doppler shift, Doppler spread, average delay, and/or delay spread, of a downlink channel or signal or uplink channel or signal may be inferred. QCL-TypeB and QCL-TypeC may also indicate reference signals (e.g., SSB, CSI-RS, or SRS) from which specific LSPCPs (e.g., Doppler shift and/or Doppler spread for QCL-TypeB and average delay and/or delay spread for QCL-TypeC) may be inferred. QCL-TypeD may indicate a spatial receive (RX) parameter (e.g., spatial property of the beam on which a downlink/uplink channel or signal is transmitted). The spatial property of the beam may be inferred from the beam utilized for transmission of a reference signal (e.g., SSB, CSI-RS, or SRS) and may indicate, for example, at least one of a beam direction or a beam width.

QCL information may be conveyed via transmission configuration indication (TCI) states. A TCI state includes or maps to QCL relationship configurations between one or more reference signals (e.g., SSB, CSI-RS, and SRS) and downlink (DL) or uplink (UL) transmissions. For example, a TCI state may include a DL TCI for a downlink transmission, a joint DL/UL TCI, or spatial relation information for an UL transmission. For example, the TCI state can include one or more reference signal IDs, each identifying an SSB resource, a CSI-RS resource, or an SRS resource. Each resource (SSB, CSI-RS, or SRS resource) indicates the particular beam, frequency resource, and OFDM symbol on which the corresponding reference signal is communicated. Thus, in examples in which the TCI state indicates QCL-TypeD for a downlink or uplink transmission, the reference signal ID may be utilized to identify the beam to be used for the downlink or uplink transmission based on the QCL relationship with an associated reference signal (e.g., SSB, CSI-RS, or SRS) indicated in the TCI state.

FIGS. 6A-6C illustrate examples of full-duplex communication in unpaired spectrum. In the examples shown in FIGS. 6A-6C, time is in the horizontal direction and frequency is in the vertical direction. Here, a carrier bandwidth 602 (or set of one or more active bandwidth parts (BWPs)) is illustrated along the frequency axis and a slot 604 is illustrated along the time axis.

FIGS. 6A and 6B illustrate in-band full-duplex (IBFD) communication, while FIG. 6C illustrates sub-band FDD (or sub-band full-duplex (SBFD)) communication. For IBFD communication, as shown in FIGS. 6A and 6B, downlink and uplink transmissions occur on the same time and frequency resources. For example, downlink resources 606 allocated for transmissions in the downlink direction overlap in both time and frequency with uplink resources 608 allocated for transmissions in the uplink direction. The overlap may be full (as shown in FIG. 6A) or partial (as shown in FIG. 6B).

For sub-band FDD communication, as shown in FIG. 6C, the carrier bandwidth 602 (or active BWPs) may be divided into sub-bands 610*a* and 610*b*. Each sub-band 610*a* and 610*b* may be allocated for communication in a single direction. For example, sub-band 610*a* may be allocated for downlink transmissions, while sub-band 610*b* may be allocated for uplink transmissions. Thus, downlink resources 606 allocated for transmissions in the downlink direction overlap in time, but not in frequency, with uplink resources 608 allocated for transmissions in the uplink direction. The downlink resources 606 may further be separated from the uplink resources 608 in the frequency domain by a guard band 612 to isolate the uplink and downlink transmissions in frequency.

Figure 7A:
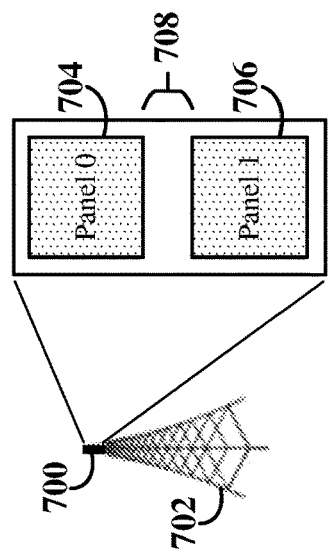
FIG. 7A is a schematic diagram of a base station (e.g., gNB) including an antenna array configured for full-duplex communication according to some aspects.

FIG. 7A is a schematic diagram of a base station 702 (e.g., gNB) including an antenna array 700 configured for full-duplex communication according to some aspects. The antenna array 700 is divided into two panels (panel 0 704, panel 1 706) with a physical separation 708 therebetween. Each of the two panels may be a subarray of antennas. A given panel may transmit and/or receive a beam or a beam group. In one example, the panels may be physically separated from one another by a distance selected to provide improved isolation between simultaneous transmission (Tx) and reception (Rx) operations in full-duplex mode, thereby mitigating at least a portion of self-interference resulting from signals being simultaneously transmitted/received. A multi-panel antenna configuration with antenna panels located at disparate positions may also be applicable to UEs to enable full-duplex communication at the UE.

Figure 7B:
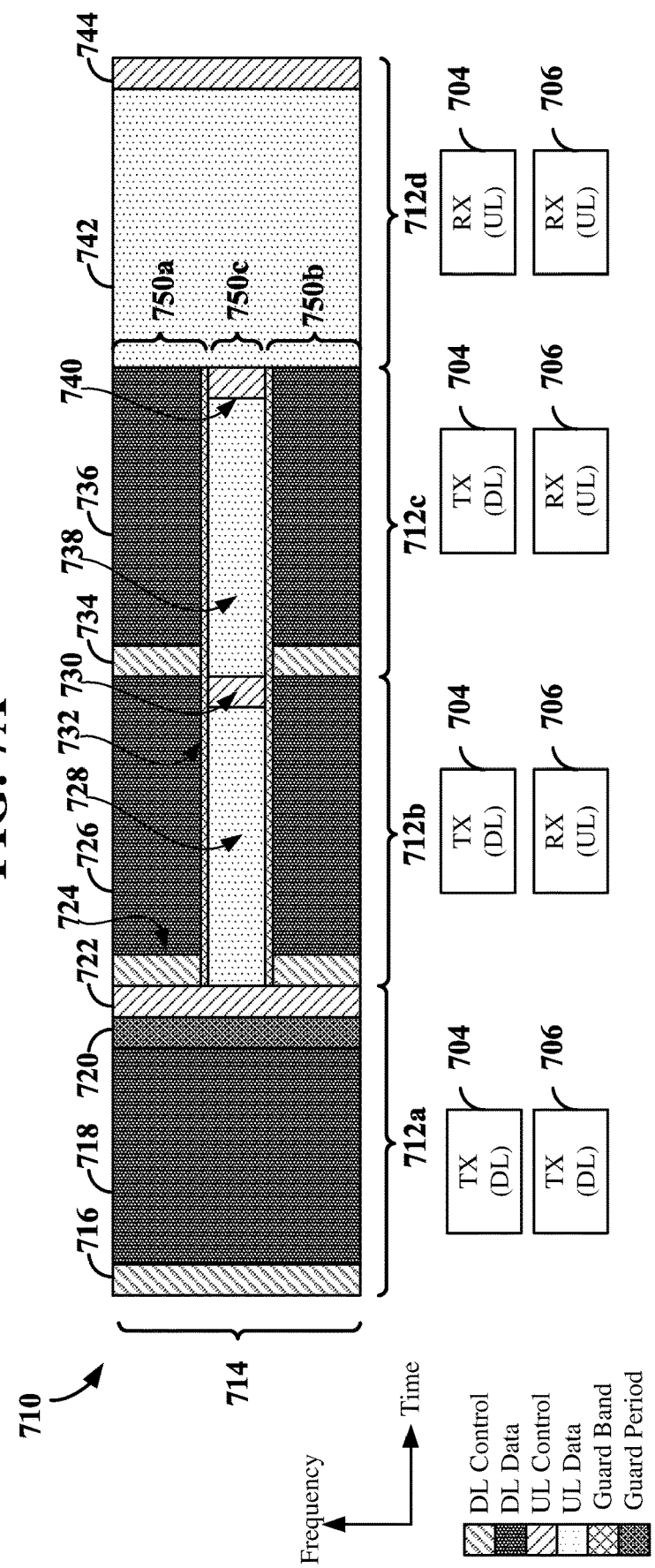
FIG. 7B is a schematic illustration of an example of full-duplex wireless communication using the multi-panel antenna array shown in FIG. 7A according to some aspects.

FIG. 7B is schematic illustration of an example of sub-band full-duplex wireless communication 710 using the multi-panel antenna array 700 shown in FIG. 7A according to some aspects. In the example shown in FIG. 7B, time is in the horizontal direction with units of slots 712*a*-712*d*, each including a plurality of OFDM symbols; and frequency is in the vertical direction. Here, a carrier bandwidth 714 (or set of one or more active BWPs) is illustrated along the frequency axis. The carrier bandwidth 714 (or active BWPs) may be divided into a number of sub-bands 750*a*-750*c* for sub-band FDD full-duplex operation.

In the example shown in FIG. 7B, in slot 712*a*, the antenna array 700 is first configured for downlink (DL) communication (e.g., DL burst 716 and DL data portion 718). The DL burst 716 may include DL control transmitted within the first few symbols of the slot 712*a*. The DL burst 716 may include, for example, a physical downlink control channel (PDCCH) carrying DCI that may be related to the slot 712*a* or a previous or subsequent slot. In an example, the DCI may include common DCI or UE-specific DCI. The common DCI may include, for example, common control information broadcast to a group of UEs or all UEs in the cell. The UE-specific DCI may include, for example, HARQ feedback information (e.g., ACK/NACK), scheduling information for scheduling a downlink data transmission and/or uplink transmission in the slot 712a or a subsequent slot (e.g., slot 712b, 712c, and/or 712d), and other suitable information. The DL burst 716 may further include various DL reference signals (e.g., SSB and/or CSI-RS). In this example, both panel 0 704 and panel 1 706 may be configured for DL transmission. The DL data portion 718 may include DL data carried within, for example, a PDSCH. In addition to the DL data, the DL data portion 718 may further include DL reference signals (e.g., DMRS) for use in demodulating and decoding the DL data.

Slot 712a may also include a common uplink (UL) burst 722 at the end of slot 712a. The common UL burst 722 may include, for example, a PUCCH carrying uplink control information (UCI) and other UL signals. As illustrated in FIG. 7B, the end of the DL data portion 718 may be separated in time from the beginning of the UL burst 722. This time separation 720 may sometimes be referred to as a gap, a guard period, a guard interval, and/or various other suitable terms. This separation may provide time for the base station and UE to perform a switch-over between transmitting and receiving, or vice-versa. In this example, both panel 0 704 and panel 1 706 may be configured for UL transmission during the UL burst 722.

In slots 712b and 712c, the antenna array 700 is configured for both DL communication and UL communication. For example, in slots 712b and 712c, the carrier bandwidth 714 (or active BWPs) is shown partitioned between uplink transmissions and downlink transmissions. Sub-bands 750a and 750b are allocated for downlink transmissions, while sub-band 750c is allocated for uplink transmissions. In an example operation of the sub-band full-duplex (SBFD) configuration shown in FIG. 7, panel 0 704 may be configured for DL transmission at both edges (e.g., sub-bands 750a and 750b) of the carrier bandwidth 714 (or active BWPs) and panel 1 706 may be configured for UL reception in the middle (e.g., sub-band 750c) of the carrier bandwidth 714 (or active BWPs).

In each of the SBFD slots 712b and 712c, the DL sub-bands 750a and 750b include a DL burst 724 and 734, respectively, which may include a PDCCH carrying DCI and/or DL reference signals, in the beginning portion of the slots 712b and 712c. Following the DL bursts 724 and 734, slots 712b and 712c each include a DL data portion 726 and 736, respectively, for transmitting DL data within sub-bands 750a and 750b. For example, the DL data may be transmitted within a PDSCH. In addition to the DL data, the DL data portions 726 and 736 may further include DL reference signals (e.g., DMRS) for use in demodulating and decoding the DL data.

In the uplink (UL) sub-band 750c, the slots 712b and 712c each include an UL data portion 728 and 738, respectively, for transmitting UL data. For example, the UL data may be transmitted within a PUSCH. Following the UL data portions 728 and 738, the UL sub-band 750c of slots 712b and 712c each include an UL burst 730 and 740, respectively. The UL burst 730 and 740 may include, for example, a PUCCH including UCI and/or other UL signals. Guard bands 732 are further provided between the UL sub-band 750c and the DL sub-bands 750a and 750b to mitigate self-interference between simultaneous DL transmissions in the DL sub-bands 750a and 750b and UL transmissions in the UL sub-band 750c.

Slots 712b and 712c are SBFD slots utilizing FDM for multiplexing uplink and downlink transmissions in frequency. The SBFD slot configurations shown in FIG. 7 are merely exemplary, and other configurations of SBFD slots may be utilized in various aspects of the disclosure. For example, SBFD slots including other configurations of UL and DL sub-bands (e.g., the configuration shown in FIG. 6C, the IUD configurations shown in FIGS. 6A and 6B, or other suitable full duplex configurations) may be employed in various aspects.

In slot 712d, the antenna array 700 is configured for UL communication. For example, slot 712d includes an UL data portion 742 followed by an UL burst 744. The UL data portion 742 and UL burst 744 may include UL control information and/or UL data, as discussed above. In this example, both panel 0 704 and panel 1 706 may be configured for UL reception. Slots 712a and 712d are half-duplex TDD slots utilizing TDM for multiplexing DL transmissions and UL transmissions in time.

In some aspects of the disclosure, one or more slots may be flexible slots including one or more flexible symbols that may be configured as either half-duplex symbols (e.g., all UL or all DL) or full-duplex symbols (e.g., including both UL and DL transmissions). For example, in slot 712b, the DL burst 724 may be configured to occupy all sub-bands 750a-750c of the slot 712b, and as such, the symbols corresponding to the DL burst 724 may be flexible symbols that may be configured as half-duplex symbols to enable DL communication across all sub-bands 750a-750c. Similarly, the UL burst 730 may be configured to occupy all sub-bands 750a-750c of the slot 712b, and as such, the symbols corresponding to the UL burst 730 may be flexible symbols that may be configured as half-duplex symbols to enable UL communication across all sub-bands 750a-750c.

In SBFD operation, the slot formats can be classified according to the duplex mode of the base station. For example, the slot may be classified as a half-duplex slot (e.g., slot 712a or 712b) including symbols dedicated to either DL transmission or UL transmission based on TDM. In addition, the slot may be classified as a full-duplex (or sub-band full-duplex) slot (e.g., slot 712b or 712c) including a hybrid of DL and UL transmissions based on FDM. The slot may further be classified as a flexible slot that may be partially or fully configurable (e.g., one or more symbols may be flexible symbols).

As discussed above, a base station may include an antenna array divided into multiple antenna panels. In a full-duplex mode, the base station may configure a first antenna panel for downlink transmission and a second antenna panel for uplink reception that is separate from the first antenna panel. The first antenna panel and the second antenna panel may be physically separated to avoid or reduce an interference. When the antenna panels are physically separated, a first channel associated with the first antenna panel may have different characteristics from a second channel associated with the second antenna panel. In a TDD mode, the first and second antenna panels may be used for uplink reception or downlink transmission. Further, a channel in a TDD mode may be different from channels used in a full-duplex mode such as a SBFD mode, IBFD mode, or FDD in paired spectrum due to a different number of antenna ports and total power.

Figure 8:
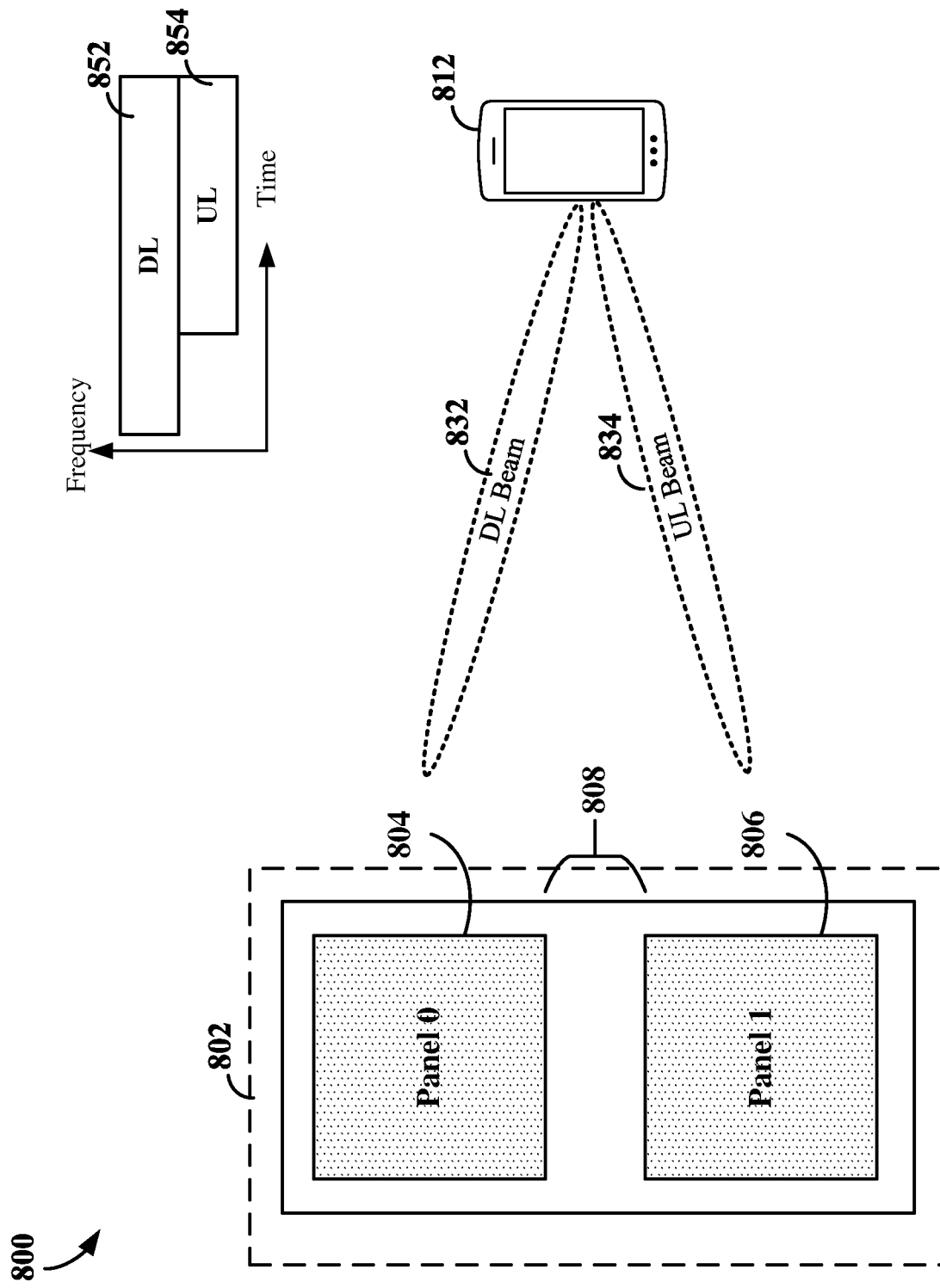
FIG. 8 is an example diagram illustrating communication between a multi-panel base station and a UE.

FIG. 8 is an example diagram 800 illustrating communication between a multi-panel base station and a UE. In FIG.

8, a base station 802 (e.g., gNB) may communicate with a UE 812, where the base station 802 includes two antenna panels (panel 0 804, panel 1 806) with a physical separation 808 therebetween. In an aspect, the base station 802 may correspond to the base station 702 of FIG. 7. In a full-duplex mode, for example, the panel 0 804 is configured as a transmission panel for downlink transmission and the panel 1 806 is configured as a reception panel for uplink reception. Because the panel 0 804 is configured for downlink transmission, a downlink beam 832 directed from the panel 0 804 may be utilized for communication with the UE 812. Further, because the panel 1 806 is configured for uplink reception, an uplink beam 834 directed towards the panel 1 806 may be utilized for communication with the UE 812. As shown in FIG. 8, the beam direction of the downlink beam 832 from the panel 0 804 is different from the beam direction of the uplink beam 834 toward the panel 1 806 as the panel 0 804 and the panel 1 806 are positioned apart from each other. Further, as shown in FIG. 8, during the full-duplex mode, downlink communication 852 on downlink beam 832 and uplink communication 854 on uplink beam 834 may take place simultaneously.

During a full-duplex operation, the base station may perform panel switching, which involves switching a configuration of at least one antenna panel between a transmit configuration and a receive configuration. For example, in FIG. 8, the panel 0 804 may switch from the transmit configuration to the receive configuration, and the panel 806 may switch from the receive configuration to the transmit configuration. When the panel switching occurs, uplink beam correspondence and channel reciprocity may need to be updated.

Figure 9A:
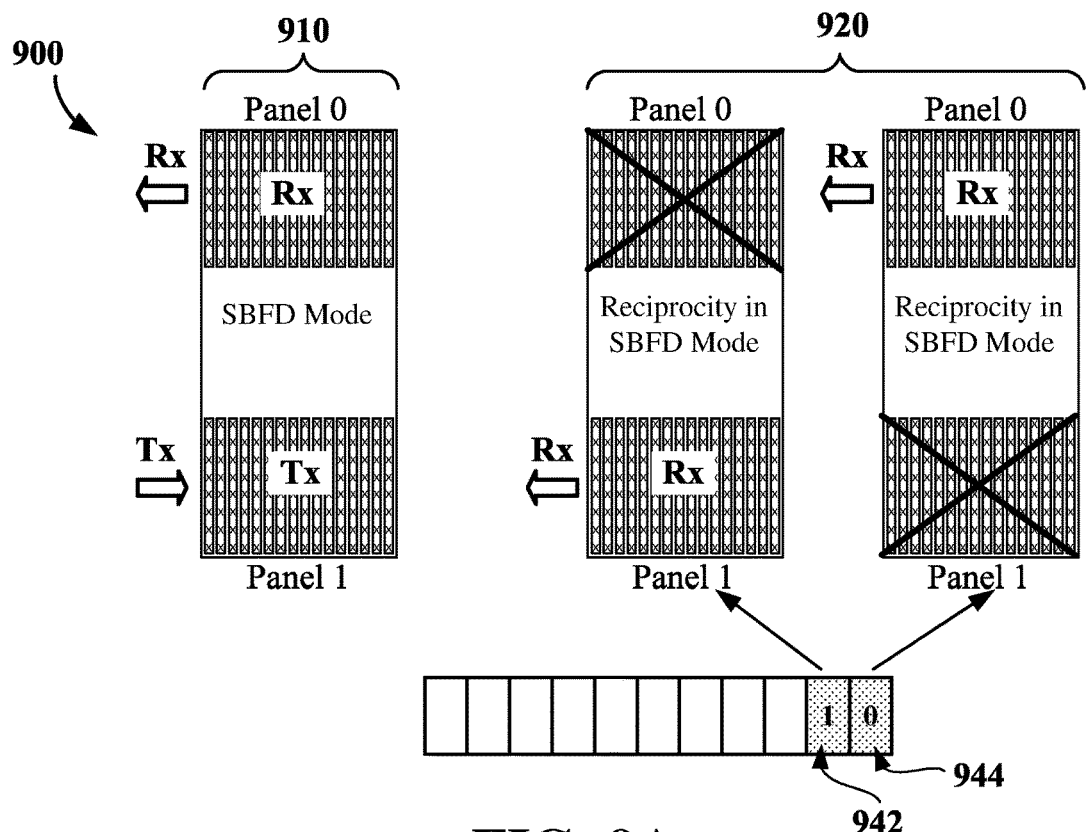
FIGS. 9A and 9B are example diagrams illustrating multiple panels in a multi-panel base station operating in various modes, according to two different scenarios.
Figure 9B:
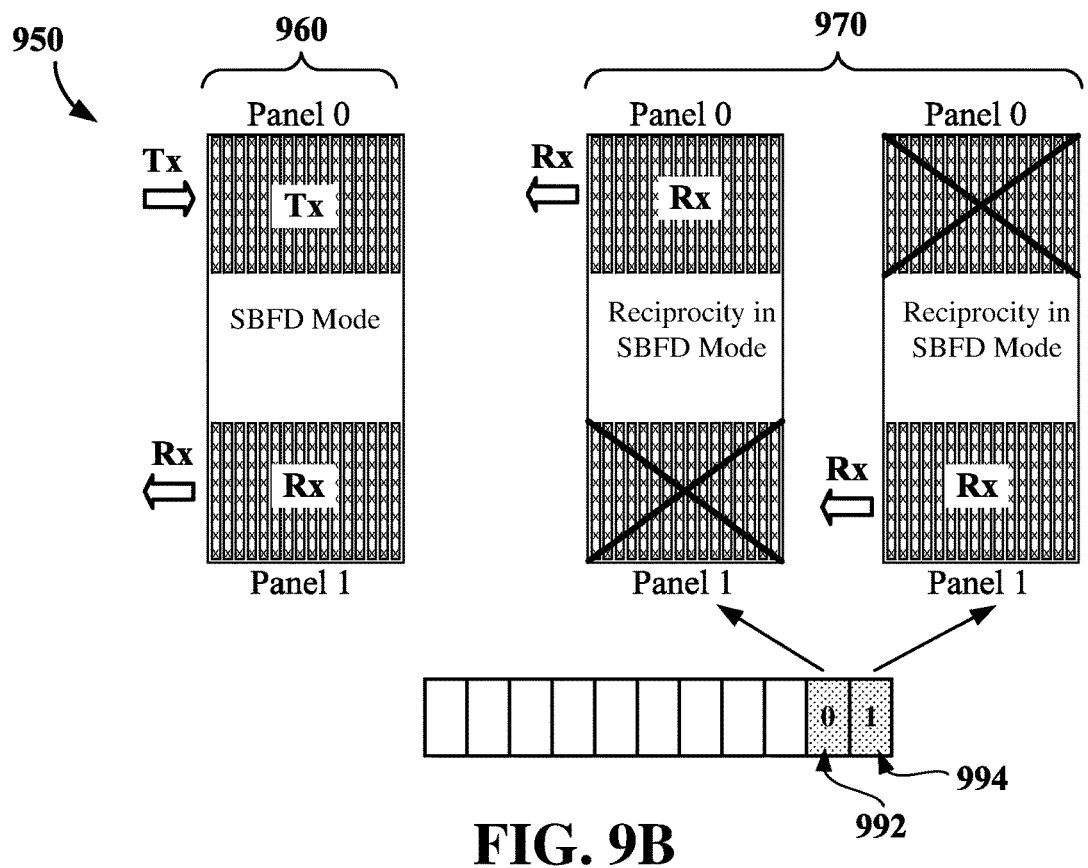

FIGS. 9A and 9B are example diagrams illustrating multiple panels in a multi-panel base station operating in various modes, according to two different scenarios. FIG. 9A is an example diagram 900 illustrating multiple panels in a multi-panel base station with a first antenna panel in a receive configuration and a second antenna panel in a transmit configuration while in an SBFD mode. As shown in FIG. 9A, when operating in the SBFD mode 910, the panel 1 (e.g., top panel) is in the receive (Rx) configuration mode and the panel 0 (e.g., bottom panel) is in the transmit (Tx) configuration mode, and thus transmission and reception may be performed simultaneously. To facilitate panel switching, the base station may receive a respective SRS on each of the panels and obtain channel state information (CSI) for each panel separately. Thus, the number of SRS resources for receiving SRS may be duplicated (e.g., one SRS resource for panel 1 and another SRS resource for panel 2). For example, as shown in FIG. 9A, the panel 1 may utilize a first SRS symbol 942 to receive one SRS while the panel 0 is not utilized, and the panel 0 may utilize a second SRS symbol 944 to receive another SRS while the panel 1 is not utilized. The received SRS from the panel 1 and the received SRS from the panel 0 may be combined for two-panel uplink CSI acquisition.

Based on the separately received SRSs, the base station may estimate the respective channel between the UE and the base station for each panel and determine a respective uplink beam for each panel. Based on the channel reciprocity between downlink and uplink for panel 1, the base station may further determine a downlink beam to utilize on the panel 1 from the SRS transmitted on SRS symbol 942. In addition, based on the channel reciprocity between downlink and uplink for panel 0, the base station may determine a downlink beam to utilize on panel 0 from the SRS transmitted on SRS symbol 944. For example, the downlink beams on each panel may correspond to the respective uplink beams selected for each panel based on the SRSs. Utilizing a separate SRS symbol for each panel may thus enable improved quality of channel estimation and beam selection. In addition, each SRS resource may be configured for the entire band instead of the narrower uplink sub-band to further improve the channel estimation quality and beam selection.

FIG. 9B is an example diagram 950 illustrating multiple panels in a multi-panel base station with a first antenna panel (e.g., top panel) in a transmit configuration and a second antenna panel (e.g., bottom panel) in a receive configuration while in an SBFD mode. As shown in FIG. 9B, when operating in the SBFD mode 960, the panel 0 (e.g., top panel) is in the receive (Rx) configuration mode and the panel 1 (e.g., bottom panel) is in the transmit (Tx) configuration mode, and thus transmission and reception may be performed simultaneously. To facilitate panel switching, at 970, the base station may receive a respective SRS and obtain channel state information (CSI) for each panel separately. In FIG. 9B, at 970, the panel 0 may utilize a first SRS symbol 992 to receive one SRS while the panel 1 is not utilized, and the panel 1 may utilize a second SRS symbol 994 to receive another SRS while the panel 0 is not utilized.

Figure 10:
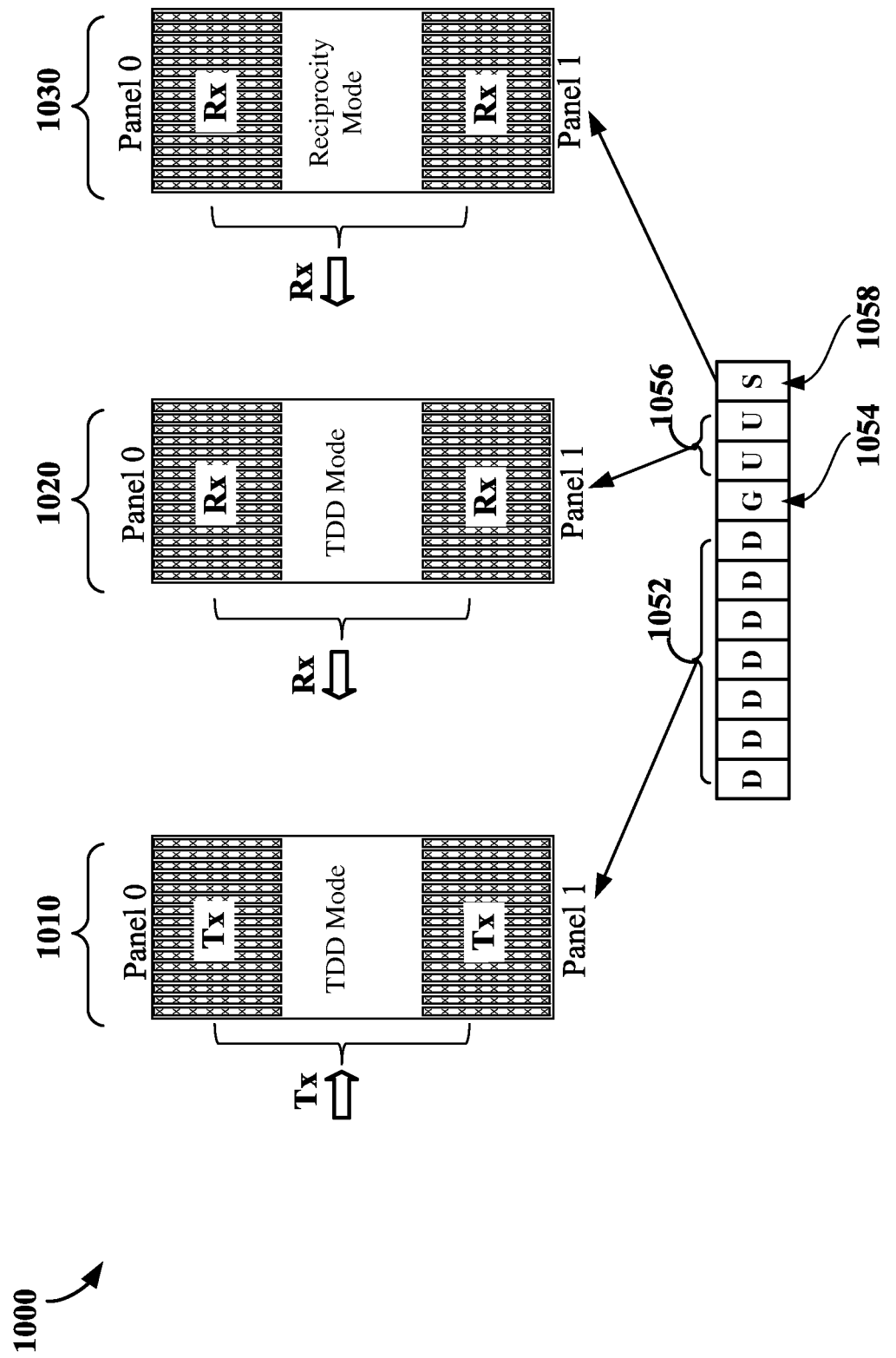
FIG. 10 is an example diagram illustrating a multi-panel base station in a division duplex (TDD) mode and a reciprocity mode.

FIG. 10 is an example diagram 1000 illustrating a multi-panel base station in a TDD mode. In FIG. 10, the panels are used for either a transmit configuration or a receive configuration. When in the transmit configuration, CSI and a downlink beam for downlink communication may be obtained by transmitting downlink reference signals (e.g., SSBs or CSI-RSs) to the UE, which may then feedback a CSI report to the base station. Further, when in the receive configuration, CSI and an uplink beam for uplink communication may be obtained by receiving and measuring uplink reference signals (e.g., SRSs) from the UE. In the example shown in FIG. 10, the downlink and uplink channels are reciprocal, and therefore, the panel 0 and the panel 1 are not treated separately in estimating the channel.

In FIG. 10, during a transmit TDD mode 1010, the panel 0 and panel 1 are in the transmit configuration, where a downlink signal may be received in a transmit path and may be split into the panel 0 and the panel 1. The downlink signal may be transmitted using the downlink symbols 1052. During a receive TDD mode 1020, the panel 0 and panel 1 are in the receive configuration, where uplink signals may be received via the panel 0 and the panel 1 and then may be combined. The uplink signals may be received using the uplink symbols 1056. A guard symbol 1054 may exist between the downlink symbols 1052 and the uplink symbols 1056. To estimate the channel using uplink measurements, at 1030, the panel 0 and panel 1 may be in the receive configuration to receive an SRS via the panel 0 and the panel 1. The SRS may be received, for example, using an SRS symbol 1058.

Panel switching may be performed to switch configurations of different antenna panels between different modes. For example, when switching between an SBFD mode and a TDD mode, a configuration of one or more antenna panels may be switched between a transmit configuration and a receive configuration. In the SBFD mode, uplink CSI may be different for each antenna panel. For each antenna panel in a receive configuration, a particular uplink spatial filter for a particular beam is determined. Further, uplink and downlink reciprocity in the TDD mode may be different from that of the SBFD mode, as a channel in the TDD mode is estimated for all antenna panels while a channel in the SBFD mode may be estimated for only one antenna panel. To account for the different channel reciprocities and beams, the UE may need to be informed of the antenna panel configuration of a base station. For example, the UE may need to know whether a base station has a single antenna panel or multiple antenna panels, and may also need to know related information on the antenna panel configuration for the antenna panels of the base station, such as information on whether an antenna panel is in an uplink configuration or in a downlink configuration. Further, the UE may need to know which antenna panel(s) of the base station are configured for communication with the UE.

According to some aspects of the disclosure, a base station with multiple antenna panels may indicate to the UE that the base station has multiple antenna panels by providing indicators that respectively identify the multiple antenna panels, where each indicator identifies a respective antenna panel. As such, the UE may be aware of the antenna panels of the base station, and thus may adjust its configuration (e.g., beam selection) depending on which antenna panel of the base station is communicating with the UE (e.g., based on the indicators). The UE may be a UE or a scheduled entity illustrated in FIGS. 1, 2, 4, 7, and 8, and the base station may be a base station, a gNB, a scheduling entity illustrated in FIGS. 1, 2, 4, 7, and 8. In an aspect, based on the indicators provided by the base station, the UE may determine which antenna panels to communicate with. The indicators may include panel identifiers that respectively identify the multiple antenna panels, uplink spatial filters that respectively correspond to the multiple antenna panels, and/or transmission configuration indication (TCI) states that respectively correspond to the multiple antenna panels.

In an aspect, the base station may identify an SRS resource or multiple SRS resources (e.g., in an SRS resource set), such that each SRS resource is associated with at least one indicator identifying at least one antenna panel of the base station. These one or more SRS resources identified by the base station may be indicated by resource information transmitted to the UE. For example, the base station may transmit the resource information indicating the one or more SRS resources by transmitting an SRS resource configuration of the one or more SRS resources. As such, the UE may determine which antenna panels to communicate with based on the indicators. Further, the UE may determine which SRS resource to utilize to transmit a particular SRS to a particular antenna panel, based on the one or more SRS resources indicated by the resource information from the base station and the indicators provided by the base station.

In an aspect, the base station may provide the indicators to the UE in a static manner, e.g., via an RRC message including an RRC configuration. For example, the SRS resource configuration of the one or more SRS resources including the indicators may be transmitted via the RRC message, where the RRC configuration in the RRC message may include the SRS resource configuration.

In an aspect, identifying the one or more SRS resources by the base station may be performed for every SRS usage. The SRS usages may include one or more of a codebook usage, a non-codebook usage, antenna switching, beam management, or beam/transmission positioning based on at least one SRS. In an aspect, identifying the one or more SRS resources by the base station may be performed for every SRS type. The SRS type may include one or more of a periodic SRS type, a semi-persistent SRS type, and/or an aperiodic SRS type. Therefore, for example, the one or more SRS resources may be identified for a periodic SRS type, a semi-persistent SRS type, and/or an aperiodic SRS type.

In an aspect, during a UE beam refinement procedure, the base station may transmit a downlink reference signal on each antenna panel of the base station, e.g., via a corresponding downlink reference signal beam on the base station. The UE may receive the downlink reference signals respectively via multiple UE beams, where each downlink reference signal is associated with a respective indicator for a particular antenna panel. For example, the indicators identifying the antenna panels for the downlink reference signals may be provided via an RRC message. When the UE receives a downlink reference signal, the UE may determine which antenna panel is used to transmit the downlink reference signal based on a respective indicator associated with the downlink reference signal (e.g., using the beam correspondence). The UE may then select a respective UE beam for each of the downlink reference signal beams to form respective beam pair link(s) (BPL(s)) for each of the antenna panels. As discussed above, the indicators may be the panel identifiers, the uplink spatial filters, and/or the TCI states. Each downlink reference signal may include an SSB and/or a CSI-RS.

In an aspect, the base station may provide the indicators to the UE in a dynamic manner, e.g., in response to a particular event and/or condition. For example, the base station may provide the indicators when panel switching and/or configuration changes associated with the antenna panels occur, since such an event should be indicated to the UE for the UE to make proper adjustments. In an aspect, the base station may transmit the SRS resource configuration of the one or more SRS resources including the indicators when panel switching and/or configuration changes associated with the antenna panels occur. In an aspect, the SRS resource configuration may be transmitted via a message for updating an RRC configuration. In an aspect, the message for updating the RRC configuration may be a MAC-CE. In an aspect, the dynamic manner of providing the indicators may take place after the static manner of providing the indicators (e.g., after the RRC configuration)

In an aspect, if multiple SRS resources are configured by the base station for the UE, the panel indicators may be included in each of the multiple SRS resources, such that there is a one-to-one mapping between the indicators and the SRS resources. For example, each SRS resource may include a single indicator for a single panel. As discussed above, the indicators may include the panel identifiers, the TCI states, and/or the uplink spatial filters.

In an aspect, in a case where an SRS resource is repeatedly used, each use of the SRS resources may correspond to a different antenna panel. Thus, each use of the SRS resource may be associated with its own indicator for a particular antenna panel. For example, a single SRS resource may be used with one or more repetitions of the single SRS resource, where each use of the single SRS resource may be associated with a respective indicator of the at least one indicator identifying a respective antenna panel of the antenna panels. For example, a first SRS transmission using an SRS resource may be for a first antenna panel, a first repetition of the SRS transmission using the same SRS resource may be for a second antenna panel, and a second repetition of the SRS transmission using the same SRS resource may be for a third antenna panel. In this example, the SRS resource may be associated with three UL panel IDs and/or three TCI states, where a first UL panel ID and/or a first TCI state is associated with the first SRS transmission, a second UL panel ID and/or a second TCI state is associated with the second SRS transmission, and a third UL panel ID and/or a third TCI state is associated with the third SRS transmission.

In an aspect, an order or an arrangement of multiple SRS resources within an SRS resource set and/or an order or an arrangement of the multiple antenna panels may determine mapping of the multiple SRS resources with the multiple antenna panels, such that the SRS resources may be used to implicitly indicate respective antenna panels (e.g., based on an order of the SRS resources). For example, if the SRS resource set has two SRS resources, a first SRS resource may be for a first antenna panel and a second SRS resource may be for a second antenna panel.

When the UE receives the resource information indicating the one or more SRS resources from the base station, the UE may transmit SRSs respectively toward the target antenna panels of the base station. In an aspect, the UE may transmit SRSs respectively to the antenna panels of the base station based on the indicators associated with the SRS resources for the SRSs. For example, each SRS transmitted by the UE may be directed to a particular antenna panel based on a corresponding indicator. The UE may transmit the SRSs on the one or more SRS resources identified by the base station and transmitted to the UE.

When a UE receives a downlink signal from a certain direction, the UE may utilize a transmit beam in the same direction for an uplink transmission, which may be a reliable approach for a TDD mode. However, a full duplex mode, this approach may not be reliable because different panels are used for a downlink communication and an uplink communication. Hence, in an aspect, when operating in full duplex mode (e.g., SBFD), the base station may indicate to the UE a downlink TCI state that corresponds to a beam of a first antenna panel of the antenna panels of the base station and may also indicate to the UE an uplink TCI state and/or an uplink spatial filter that corresponds to a beam of a second antenna panel of the antenna panels of the base station. For example, the indicators transmitted to the UE may include a downlink TCI state associated with a downlink channel reception from the first antenna panel and may further include an uplink TCI state and/or an uplink spatial filter associated with an uplink channel transmission to the second antenna panel. According to one option, a single TCI codepoint may be used to indicate the downlink TCI state and at least one of the uplink TCI state or the uplink spatial filter. For example, the base station may transmit a single TCI codepoint to the UE, where the TCI states as the indicators are indicated via the single TCI codepoint indicating the downlink TCI state as well as the uplink TCI state and/or the uplink spatial filter. According to another option, two separate TCI codepoints may be used, one TCI codepoint to indicate the downlink TCI state and another TCI codepoint to indicate at least one of the uplink TCI state or the uplink spatial filter. For example, the base station may transmit a first code point and a second code point, where the TCI states as the indicators are indicated via the first TCI codepoint indicating the downlink TCI state and the second TCI codepoint indicating at least one of the uplink TCI state or the uplink spatial filter.

In an aspect, a time gap referred to as a guard time may be introduced between an SRS resource prior to panel switching by the base station and an SRS resource after the panel switching, to allow sufficient time for the panel switching to be completed. In an aspect, no guard time may be needed if the panel switching can be completed within a cyclic prefix. For example, in a TDD mode, when the panel switching involves a base station performing a fall back from a dual panel configuration utilizing two antenna panels to a single panel configuration utilizing one antenna panel, no guard time may be needed if such panel switching may be completed within a cyclic prefix. In this aspect, the SRS resources that include different indicators identifying different antenna panels of the base station may be located within consecutive symbols, with no guard time (e.g., no guard symbol) between the SRS resources.

Figure 11B:
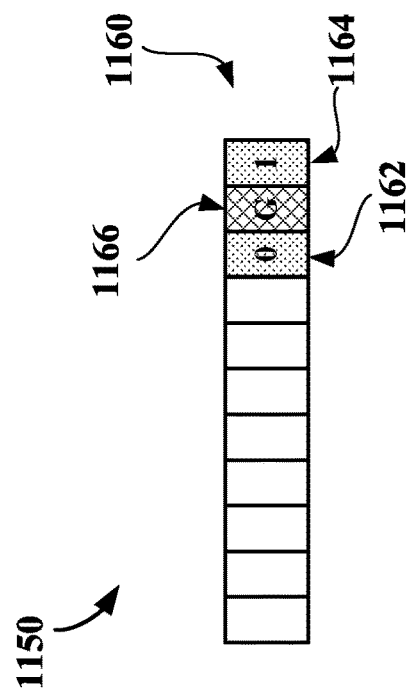
FIG. 11B is an example diagram illustrating SRS resources where a guard symbol is introduced, according to some aspects of the disclosure.
Figure 11A:
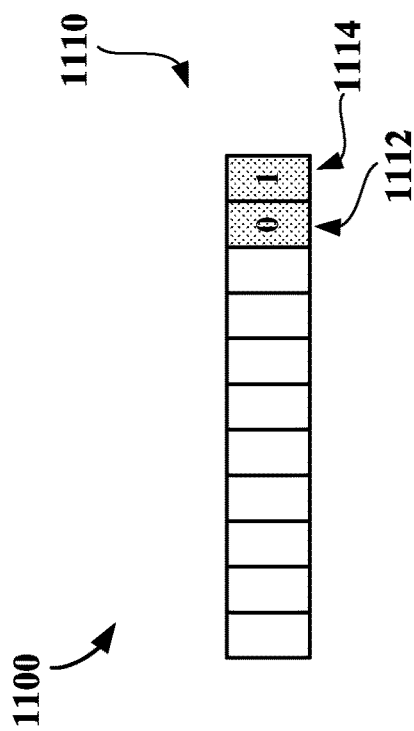
FIG. 11A is an example diagram illustrating SRS resources where a guard symbol is not introduced, according to some aspects of the disclosure.

FIG. 11A is an example diagram 1100 illustrating SRS resources where a guard symbol is not introduced, according to some aspects of the disclosure. In FIG. 11A, the time resources 1110 includes a first SRS resource 1112 prior to panel switching and a second SRS resource 1114 after the panel switching, where the panel switching can be completed within a cyclic prefix. In the example of FIG. 11A, the first SRS resource 1112 and the second SRS resource 1114 are located within consecutive symbols, with no guard symbol between the first SRS resource 1112 and the second SRS resource 1114.

In an aspect, a guard time may be needed when the panel switching cannot be completed within a cyclic prefix. For example, if the panel switching involves switching one antenna panel between a transmit configuration and a receive configuration, this may take more time and thus a guard time (e.g., a guard symbol) may be introduced to allow sufficient time for this panel switching to be completed. In this aspect, successive SRS resources that include different indicators identifying different antenna panels of the base station may be spaced apart by at least one guard symbol. In an aspect, a number of the guard symbols to be introduced between successive SRS resources is determined based on at least one of subcarrier spacing or a frequency range (e.g., depending on whether FR1 or FR2 is used). For example, a table may be used to look up a number of the guard symbols, where the table provides different numbers of the guard symbols for different subcarrier spacing values. One table for FR1 and another table for FR2 may be determined.

FIG. 11B is an example diagram 1150 illustrating SRS resources where a guard symbol is introduced, according to some aspects of the disclosure. In FIG. 1150, the time resources 1160 includes a first SRS resource 1162 prior to panel switching and a second SRS resource 1164 after the panel switching, with a guard symbol 1166 between the first SRS resource 1162 and the second SRS resource 1164, where the panel switching cannot be completed within a cyclic prefix.

In an aspect, the base station may indicate to the UE which antenna panel of the base station is in a transmit configuration and which antenna panel is in a receive configuration. For example, the base station may transmit communication configurations respectively associated with the antenna panels of the base station, where each of the communication configurations indicates a transmission configuration or a reception configuration associated with a respective antenna panel of the antenna panels. In an aspect, the antenna panels may include one or more antenna panels for transmission or reception in a TDD mode, where the communication configurations may be determined based on the TDD mode.

FIG. 12A shows two example diagrams 1200 and 1230 that illustrate the base station in a TDD mode, according to some aspects of the disclosure. In a first diagram 1200 of FIG. 12A, a single antenna panel is used in a TDD mode to perform transmission and reception at different times (e.g., different symbols or slots). As shown in the first diagram 1200, while in the TDD mode 1210 for transmission, the panel 0 (e.g., top panel) is in the transmit (Tx) configuration. Further, in the first diagram 1200, while in the TDD mode 1220 for reception, the panel 0 is in the receive (Rx) configuration. In a second diagram 1230 of FIG. 12A, two antenna panels are used in a TDD mode to perform transmission and reception. As shown in the second diagram 1230, while in the TDD mode 1240 for transmission, the panel 0 (e.g., top panel) and the panel 1 (e.g., bottom panel) are in the transmit (Tx) configuration. Further, in the second diagram 1230, while in the TDD mode 1250 for reception, the panel 0 and the panel 1 are in the receive (Rx) configuration.

In an aspect, the antenna panels may include at least one antenna panel for transmission and at least one antenna panel for reception in a full duplex mode, where the communication configurations may be determined based on the full duplex mode. FIG. 12B shows an example diagram 1260 illustrating the base station in an SBFD mode, according to some aspects of the disclosure. As shown in the example diagram 1260 of FIG. 12B, while in the SBFD mode 1270, the panel 0 (e.g., top panel) is in the transmit (Tx) configuration and the panel 1 (e.g., bottom panel) is in the receive (Rx) configuration.

Figure 13:
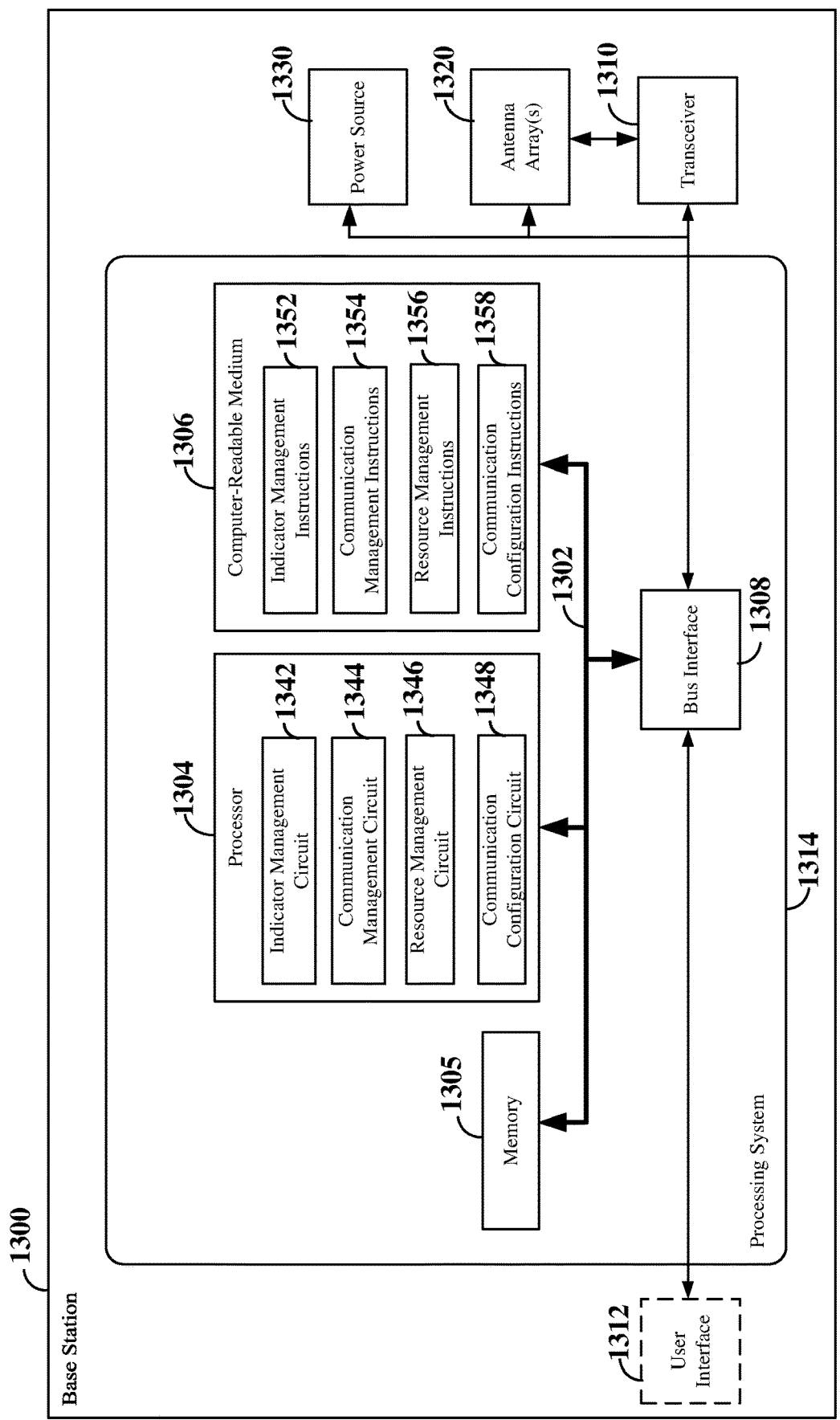
FIG. 13 is a block diagram illustrating an example of a hardware implementation for a base station employing a processing system according to some aspects.

FIG. 13 is a conceptual diagram illustrating an example of a hardware implementation for an exemplary base station 1300 employing a processing system 1314. For example, the base station 1300 may be, for example, a gNB or other scheduling entity as illustrated in any one or more of FIGS. 1, 2, 4, 7, 8, 9, 10, and/or 12.

The base station 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1300 may be configured to perform any one or more of the functions described herein. That is, the processor 1304, as utilized in a base station 1300, may be used to implement any one or more of the processes described below. The processor 1304 may in some instances be implemented via a baseband or modem chip and in other implementations, the processor 1304 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable storage medium 1306).

The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a means for communicating with various other apparatus over a transmission medium (e.g., air interface) using antenna array(s) 1320 (e.g., each including one or more antenna panels). A user interface 1312 (e.g., keypad, display, touchscreen, speaker, microphone, control knobs, etc.) may also be provided. Of course, such a user interface 1312 is optional, and may be omitted in some examples.

The processor 1304 is responsible for managing the bus 1302 and general processing, including the execution of software stored on the computer-readable storage medium 1306. The software, when executed by the processor 1304, causes the processing system 1314 to perform the various functions described below for any particular apparatus. The computer-readable storage medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1306.

The computer-readable storage medium 1306 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium may also include, by way of example, a carrier wave, a transmission line, and any other suitable medium for transmitting software and/or instructions that may be accessed and read by a computer. The computer-readable storage medium 1306 may reside in the processing system 1314, external to the processing system 1314, or distributed across multiple entities including the processing system 1314. The computer-readable storage medium 1306 may be embodied in a computer program product. In some examples, the computer-readable storage medium 1306 may be part of the memory 1305. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the processor 1304 may include circuitry configured for various functions. For example, the processor 1304 may include indicator management circuitry 1342 and communication management circuitry 1344 configured for various functions, including, for example, transmitting a plurality of indicators identifying a plurality of antenna panels on the base station to a UE, wherein each indicator of the plurality of indicators identifies a respective panel of the plurality of antenna panels. For example, the indicator management circuitry 1342 and the communication management circuitry 1344 may be configured to implement one or more of the functions described below in relation to FIGS. 14-15, including, e.g., blocks 1402 and 1502. The indicator management circuitry 1342 and the communication management circuitry 1344 may further be configured to execute indicator management software/instructions 1352 and communication management software/instructions 1354 stored in the computer-readable storage medium 1306 to perform one or more of the functions described below in relation to FIGS. 14-15, including, e.g., blocks 1402 and 1504.

In some aspects of the disclosure, the processor 1304 may include the communication management circuitry 1344 configured for various functions, including, for example, communicating with the UE based on the plurality of indicators of the plurality of antenna panels. For example, the communication management circuitry 1344 may be configured to implement one or more of the functions described below in relation to FIGS. 14-15, including, e.g., blocks 1404 and 1506. The communication management circuitry 1344 may further be configured to execute the communication management software/instructions 1354 stored in the computer-readable storage medium 1306 to perform one or more of the functions described below in relation to FIGS. 14-15, including, e.g., blocks 1404 and 1506.

In some aspects of the disclosure, the communication management circuitry 1344 may be configured for various functions, including, for example, receiving a plurality of SRSs from the UE via the plurality of antenna panels on the one or more SRS resources. For example, the communication management circuitry 1344 may be configured to implement one or more of the functions described below in relation to FIG. 15, including, e.g., block 1508. The communication management circuitry 1344 may further be configured to execute the communication management software/instructions 1354 stored in the computer-readable storage medium 1306 to perform one or more of the functions described below in relation to FIG. 15, including, e.g., block 1508.

In some aspects of the disclosure, the processor 1304 may include resource management circuitry 1346 configured for various functions, including, for example, identifying one or more sounding reference signal (SRS) resources. For example, the resource management circuitry 1346 may be configured to implement one or more of the functions described below in relation to FIG. 15, including, e.g., block 1502. The resource management circuitry 1346 may further be configured to execute resource management software/instructions 1356 stored in the computer-readable storage medium 1306 to perform one or more of the functions described below in relation to FIG. 15, including, e.g., block 1502.

In some aspects of the disclosure, the processor 1304 may include communication configuration circuitry 1348 configured for various functions, including, for example, transmitting the plurality of indicators to a UE to respectively identify the plurality of antenna panels. For example, the communication configuration circuitry 1348 may be configured to implement one or more of the functions described below in relation to FIG. 15, including, e.g., block 1510. The communication configuration circuitry 1348 may further be configured to execute communication configuration software/instructions 1358 stored in the computer-readable storage medium 1306 to perform one or more of the functions described below in relation to FIG. 15, including, e.g., block 1510.

Figure 14:
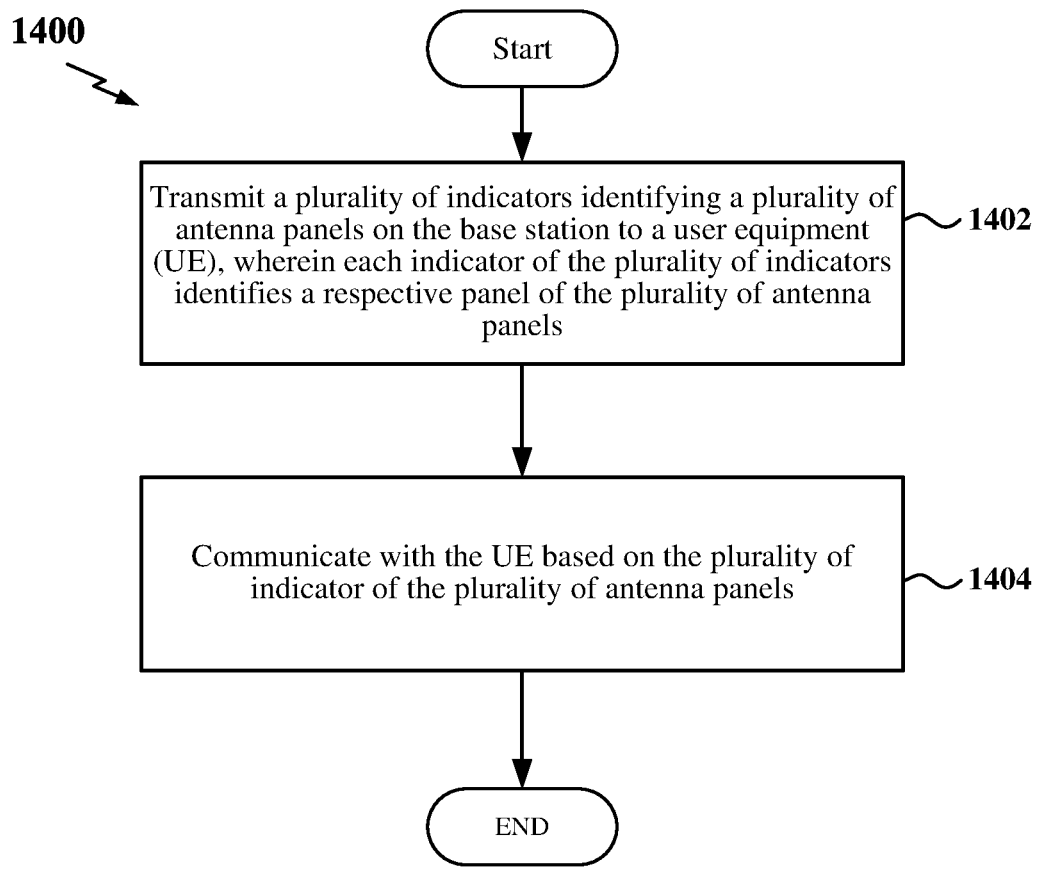
FIG. 14 is a flow chart of an exemplary method for wireless communication by a base station according to some aspects.

FIG. 14 is a flow chart 1400 of a method for wireless communication by a base station according to some aspects. As described below, some or all illustrated features may be omitted in a particular implementation within the scope of the present disclosure, and some illustrated features may not be required for implementation of all embodiments. In some examples, the method may be performed by the base station 1300, as described above and illustrated in FIG. 13, by a processor or processing system, or by any suitable means for carrying out the described functions.

At block 1402, the base station may determine a plurality of indicators identifying a plurality of antenna panels on the base station, wherein each indicator of the plurality of indicators identifies a respective antenna panel of the plurality of antenna panels. For example, the indicator management circuitry 1342 shown and described above in connection with FIG. 13 may provide means to determine the plurality of indicators.

At block 1404, the base station may transmit the plurality of indicators to a UE to respectively identify the plurality of antenna panels. For example, the communication management circuitry 1344 shown and described above in connection with FIG. 13 may provide means to transmit the plurality of indicators.

In one configuration, a base station 1300, such as a gNB, includes means for performing the various functions and processes described in relation to FIG. 14. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, 4, 7, 8, 9, 10, and/or 12, and utilizing, for example, the processes and/or algorithms described herein in relation to FIG. 14.

Figure 15:
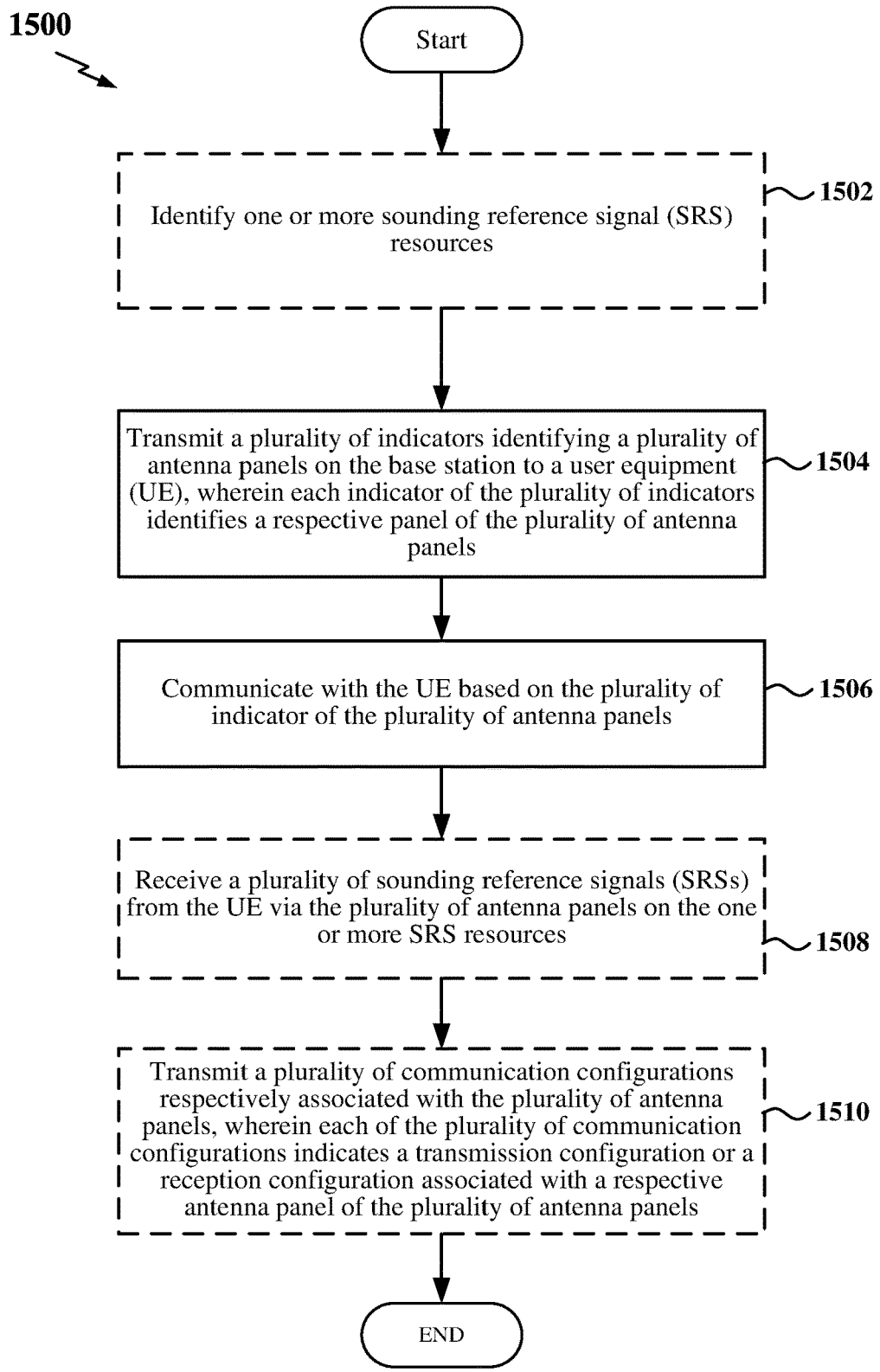
FIG. 15 is a flow chart of an exemplary method for wireless communication by a base station according to some aspects.

FIG. 15 is a flow chart 1500 of a method for wireless communication by a base station according to some aspects. As described below, some or all illustrated features may be omitted in a particular implementation within the scope of the present disclosure, and some illustrated features may not be required for implementation of all embodiments. In some examples, the method may be performed by the base station 1300, as described above and illustrated in FIG. 13, by a processor or processing system, or by any suitable means for carrying out the described functions.

At block 1502, the base station may identify one or more SRS resources. For example, the resource management circuitry 1346 shown and described above in connection with FIG. 13 may provide means to identify the one or more SRS resources.

At block 1504, the base station may transmit a plurality of indicators identifying a plurality of antenna panels on the base station to a UE, wherein each indicator of the plurality of indicators identifies a respective panel of the plurality of antenna panels. For example, the indicator management circuitry 1342 and the communication management circuitry 1344 shown and described above in connection with FIG. 13 may provide means to transmit the plurality of indicators.

In an aspect, transmitting the plurality of indicators at block 1506 may include transmitting resource information indicating the one or more SRS resources, wherein each SRS resource of the one or more SRS resources is associated with at least one indicator of the plurality of indicators identifying at least one respective antenna panel of the plurality of antenna panels. For example, the communication management circuitry 1344 shown and described above in connection with FIG. 13 may provide means to transmit the one or more SRS resources.

At block 1506, the base station may communicate with the UE based on the plurality of indicators of the plurality of antenna panels. For example, the communication management circuitry 1344 shown and described above in connection with FIG. 13 may provide means to communicate with the UE based on the plurality of indicators.

At block 1508, the base station may receive a plurality of SRSs from the UE via the plurality of antenna panels on the one or more SRS resources. For example, the communication management circuitry 1344 shown and described above in connection with FIG. 13 may provide means to receive the plurality of SRSs.

In an aspect, the plurality of indicators may include a plurality of panel identifiers respectively identifying the plurality of antenna panels, a plurality of uplink spatial filters respectively corresponding to the plurality of antenna panels, a plurality of transmission configuration indication (TCI) states respectively corresponding to the plurality of antenna panels, or a combination thereof. In an aspect, the plurality of uplink spatial filters respectively indicate a plurality of downlink reference signal beams respectively corresponding to the plurality of antenna panels, and wherein the plurality of TCI states respectively indicate the plurality of downlink reference signal beams respectively corresponding to the plurality of antenna panels. In an aspect, the plurality of downlink reference signal beams may include a plurality of synchronization signal block (SSB) beams or a plurality of channel state information reference signal (CSI-RS) beams.

In an aspect, the transmitting the resource information indicating the one or more SRS resources may include transmitting an SRS resource configuration of the one or more SRS resources. In an aspect, the one or more SRS resources may include a plurality of SRS resources and the SRS resource configuration may be associated with an SRS resource set comprising the plurality of SRS resources that are respectively associated with the plurality of antenna panels.

In an aspect, the SRS resource configuration may be transmitted via a radio resource control (RRC) message. In an aspect, the identifying the one or more SRS resources may include identifying the one or more SRS resources for at least one of a codebook usage, a non-codebook usage, antenna switching, beam management, or at least one SRS for positioning. In an aspect, the identifying the one or more SRS resources may include identifying the one or more SRS resources for at least one of a periodic SRS type, a semi-persistent SRS type, or an aperiodic SRS type.

In an aspect, the transmitting the SRS resource configuration may include transmitting the SRS resource configuration in response to panel switching of the plurality of antenna panels. In an aspect, the SRS resource configuration may be transmitted via a message for updating a radio resource control (RRC) configuration. In an aspect, the message for updating the RRC configuration may include a media access control (MAC) control element (CE).

In an aspect, the one or more SRS resources may include a plurality of SRS resources that are respectively associated with the plurality of panel identifiers, or the plurality of TCI states, or the plurality of uplink spatial filters, or a combination thereof.

In an aspect, the one or more SRS resources may include at least one SRS resource that is repeatedly used for a plurality of SRS transmissions, each of the plurality of SRS transmissions using the at least one SRS resource associated with a respective indicator of the at least one indicator identifying a respective antenna panel of the plurality of antenna panels.

In an aspect, the one or more SRS resources may include a plurality of SRS resources, each comprising a single respective indicator of the plurality of indicators identifying a single antenna panel of the plurality of antenna panels.

In an aspect, panel switching associated with the plurality of antenna panels may be performed within a cyclic prefix, the one or more SRS resources may include a plurality of SRS resources, and successive SRS resources of the plurality of SRS resources associated with different indicators of the plurality of indicators identifying different antenna panels of the plurality of antenna panels may be located within consecutive symbols.

In an aspect, panel switching associated with the plurality of antenna panels may be performed within a time duration longer than a cyclic prefix, the one or more SRS resources may include a plurality of SRS resources, and successive SRS resources of the plurality of SRS resources associated with different indicators of the plurality of indicators identifying different antenna panels of the plurality of antenna panels may be spaced apart by at least one guard symbol. In an aspect, a time gap for panel switching may be determined by a number of the at least one guard symbol and is determined based on at least one of subcarrier spacing or a frequency range.

In an aspect, the plurality of indicators may include a downlink TCI state associated with a downlink channel reception from a first antenna panel of the plurality of antenna panels and at least one of an uplink TCI state or an uplink spatial filter associated with an uplink channel transmission to a second antenna panel of the plurality of antenna panels. In an aspect, the transmitting the plurality of indicators may include transmitting a single TCI codepoint indicating the downlink TCI state and at least one of the uplink TCI state or the uplink spatial filter. In an aspect, the transmitting the plurality of indicators may include transmitting a first TCI codepoint indicating the downlink TCI state and a second TCI codepoint indicating at least one of the uplink TCI state or the uplink spatial filter.

At block 1510, the base station may transmit a plurality of communication configurations respectively associated with the plurality of antenna panels, wherein each of the plurality of communication configurations indicates a transmission configuration or a reception configuration associated with a respective antenna panel of the plurality of antenna panels. For example, the communication management circuitry 1344 and the communication configuration circuitry 1348 shown and described above in connection with FIG. 13 may provide means to transmit the plurality of communication configurations.

In an aspect, the plurality of antenna panels may include one or more antenna panels for transmission or reception in a time division duplex (TDD) mode, and the plurality of communication configurations are determined based on the TDD mode. In an aspect, the plurality of antenna panels may include at least one antenna panel for transmission and at least one antenna panel for reception in a full duplex mode, and the plurality of communication configurations are determined based on the full duplex mode.

In one configuration, a base station 1300, such as a gNB, includes means for performing the various functions and processes described in relation to FIG. 15. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

In one configuration, the base station 1300 may include means for transmitting a plurality of indicators identifying a plurality of antenna panels on the base station to a user equipment (UE), wherein each indicator of the plurality of indicators identifies a respective panel of the plurality of antenna panels, and means for communicating with the UE based on the plurality of indicators of the plurality of antenna panels. In an aspect, the base station 1300 may include means for identifying one or more sounding reference signal (SRS) resources, and means for receiving a plurality of sounding reference signals (SRSs) from the UE via the plurality of antenna panels on the one or more SRS resources. In an aspect, the base station 1300 may include means for transmitting a plurality of communication configurations respectively associated with the plurality of antenna panels, wherein each of the plurality of communication configurations indicates a transmission configuration or a reception configuration associated with a respective antenna panel of the plurality of antenna panels.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, 4, 7, 8, 9, 10, and/or 12, and utilizing, for example, the processes and/or algorithms described herein in relation to FIG. 15.

Figure 16:
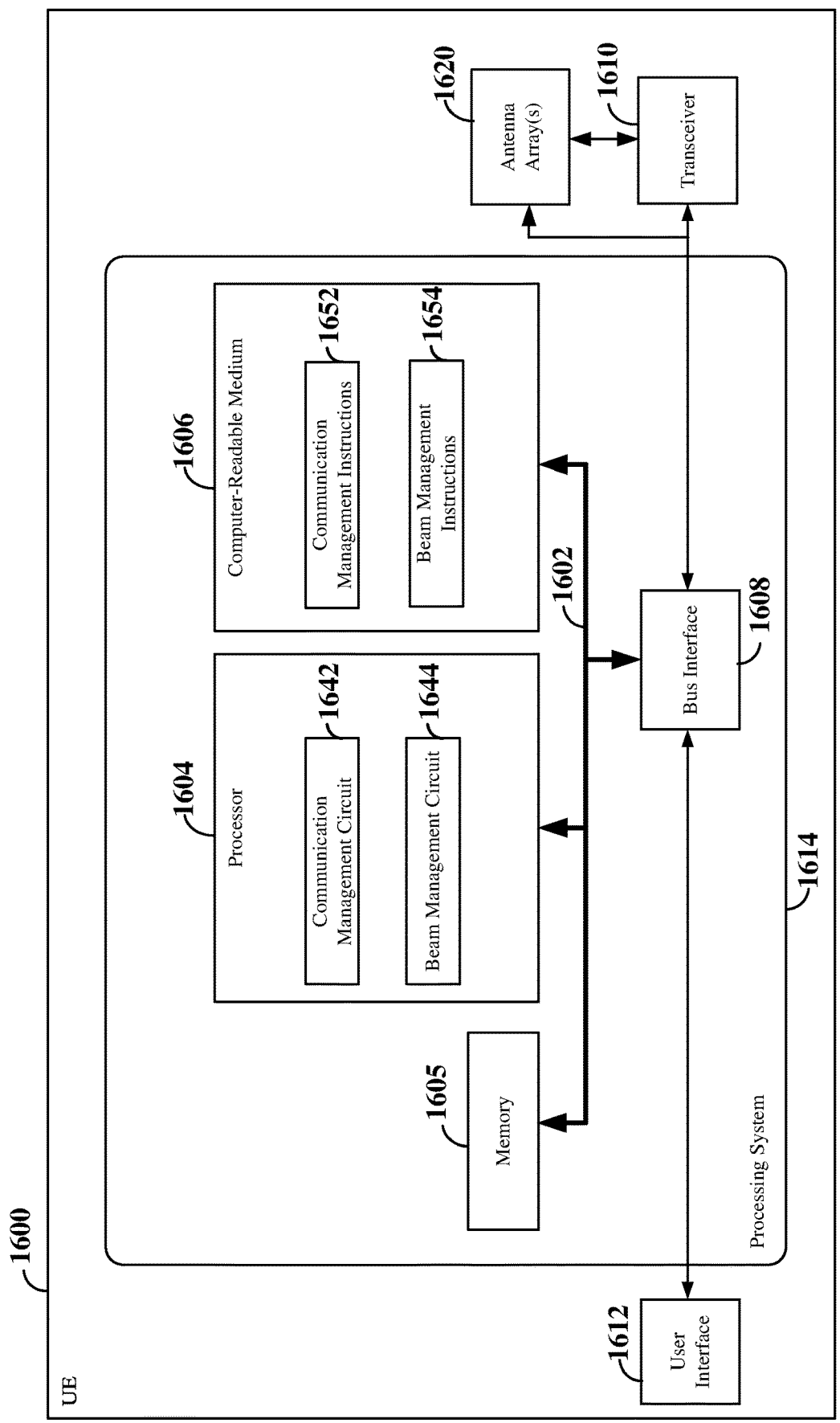
FIG. 16 is a block diagram illustrating an example of a hardware implementation for a UE employing a processing system according to some aspects.

FIG. 16 is a block diagram illustrating an example of a hardware implementation for a UE 1600 employing a processing system 1614. For example, the UE 1600 may correspond to any of the UEs or scheduled entities shown and described above in reference to FIGS. 1, 2, 4, 7, and/or 8.

In accordance with various aspects of the disclosure, an element, or any portion of an element, or any combination of elements may be implemented with a processing system 1614 that includes one or more processors 1604. The processing system 1614 may be substantially the same as the processing system 1314 illustrated in FIG. 13, including a bus interface 1608, a bus 1602, memory 1605, a processor 1604, and a computer-readable storage medium 1606. Furthermore, the UE 1600 may include a user interface 1612 and a transceiver 1610 substantially similar to those described above in FIG. 13. That is, the processor 1604, as utilized in a UE 1600, may be used to implement any one or more of the processes described below.

In some aspects of the disclosure, the processor 1604 may include circuitry configured for various functions. For example, the processor 1604 may include communication management circuitry 1642 configured for various functions, including, for example, receiving, from a base station configured to communicate via a plurality of antenna panels, a plurality of indicators to respectively identify the plurality of antenna panels. For example, the communication management circuitry 1642 may be configured to implement one or more of the functions described below in relation to FIGS. 17-18, including, e.g., blocks 1702 and 1802. The communication management circuitry 1642 may further be configured to execute communication management software/instructions 1652 stored in the computer-readable storage medium 1606 to perform one or more of the functions described below in relation to FIGS. 17-18, including, e.g., blocks 1702 and 1802.

In some aspects of the disclosure, the communication management circuitry 1642 may be configured for various functions, including, for example, transmitting a plurality of sounding reference signals (SRSs) respectively to a plurality of antenna panels of the base station based on the plurality of indicators. For example, the communication management circuitry 1642 may be configured to implement one or more of the functions described below in relation to FIGS. 17-18, including, e.g., blocks 1704 and 1808. The communication management circuitry 1642 may further be configured to execute communication management software/instructions 1652 stored in the computer-readable storage medium 1606 to perform one or more of the functions described below in relation to FIGS. 17-18, including, e.g., blocks 1704 and 1808.

In some aspects of the disclosure, the communication management circuitry 1642 may be configured for various functions, including, for example, receiving a plurality of downlink reference signals respectively via a plurality of downlink reference signal beams respectively indicated by the plurality of uplink spatial filters or the plurality of TCI states. For example, the communication management circuitry 1642 may be configured to implement one or more of the functions described below in relation to FIG. 18, including, e.g., block 1804. The communication management circuitry 1642 may further be configured to execute communication management software/instructions 1652 stored in the computer-readable storage medium 1606 to perform one or more of the functions described below in relation to FIG. 18, including, e.g., block 1804.

In some aspects of the disclosure, the communication management circuitry 1642 may be configured for various functions, including, for example, receiving a plurality of communication configurations respectively associated with the plurality of antenna panels, wherein each of the plurality of communication configurations indicates a transmission configuration or a reception configuration associated with a respective antenna panel of the plurality of antenna panels. For example, the communication management circuitry 1642 may be configured to implement one or more of the functions described below in relation to FIG. 18, including, e.g., block 1810. The communication management circuitry 1642 may further be configured to execute communication management software/instructions 1652 stored in the computer-readable storage medium 1606 to perform one or more of the functions described below in relation to FIG. 18, including, e.g., block 1810.

In some aspects of the disclosure, the processor 1604 may include beam management circuitry 1644 configured for various functions, including, for example, selecting a plurality of UE beams, wherein each UE beam of the plurality of UE beams is selected based on a respective downlink reference signal of the plurality of downlink reference signals. For example, the beam management circuitry 1644 may be configured to implement one or more of the functions described below in relation to FIG. 18, including, e.g., block 1806. The beam management circuitry 1644 may further be configured to execute beam management software/instructions 1654 stored in the computer-readable storage medium 1606 to perform one or more of the functions described below in relation to FIG. 18, including, e.g., block 1806.

Figure 17:
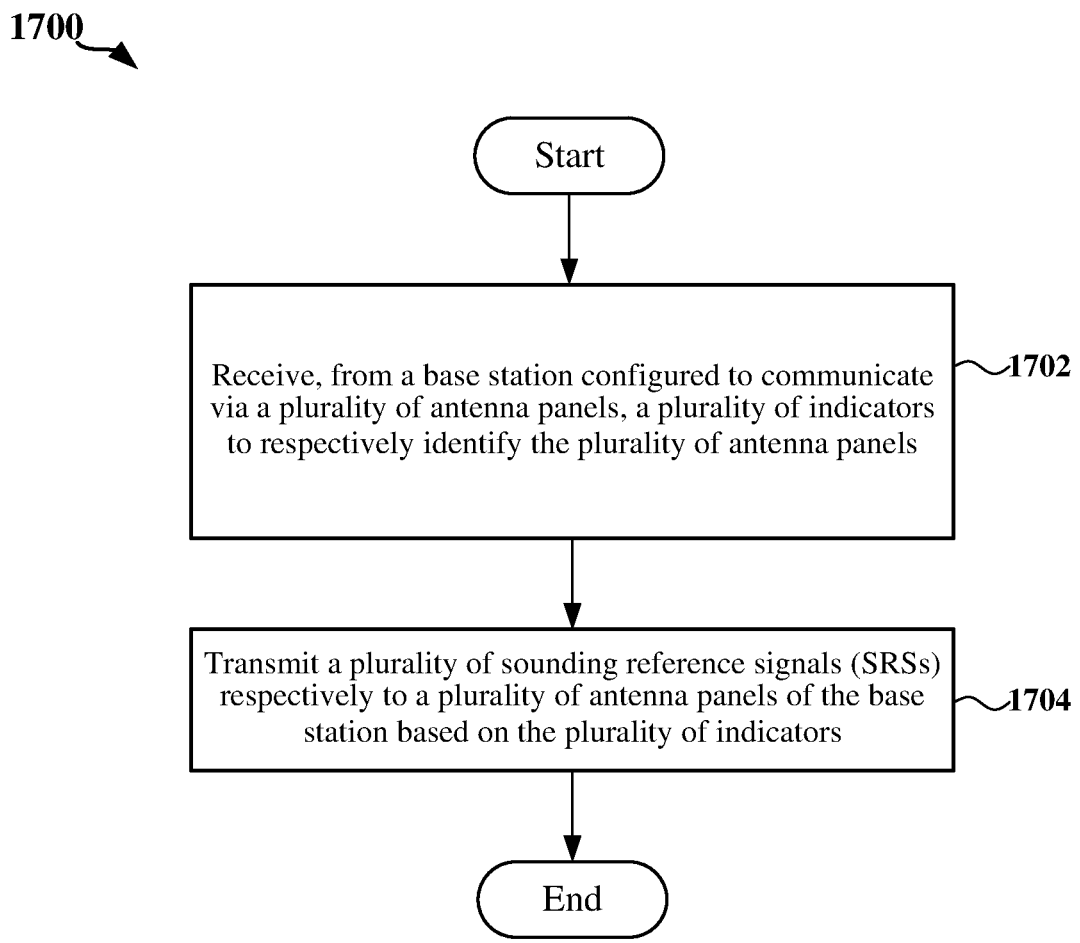
FIG. 17 is a flow chart of an exemplary method for wireless communication by a user equipment according to some aspects.

FIG. 17 is a flow chart 1700 of a method for wireless communication by a UE according to some aspects. As described below, some or all illustrated features may be omitted in a particular implementation within the scope of the present disclosure, and some illustrated features may not be required for implementation of all embodiments. In some examples, the method may be performed by the UE 1600, as described above and illustrated in FIG. 16, by a processor or processing system, or by any suitable means for carrying out the described functions.

At block 1702, the UE may receive, from a base station configured to communicate via a plurality of antenna panels, a plurality of indicators to respectively identify the plurality of antenna panels. For example, the communication management circuitry 1642 shown and described above in connection with FIG. 16 may provide means to receive the plurality of indicators.

At block 1704, the UE may transmit a plurality of SRSs respectively to a plurality of antenna panels of the base station based on the plurality of indicators. For example, the communication management circuitry 1642 shown and described above in connection with FIG. 16 may provide means to transmit the plurality of SRSs.

In one configuration, a UE 1600 includes means for performing the various functions and processes described in relation to FIG. 17. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, 4, 7, and/or 8, and utilizing, for example, the processes and/or algorithms described herein in relation to FIG. 17.

Figure 18:
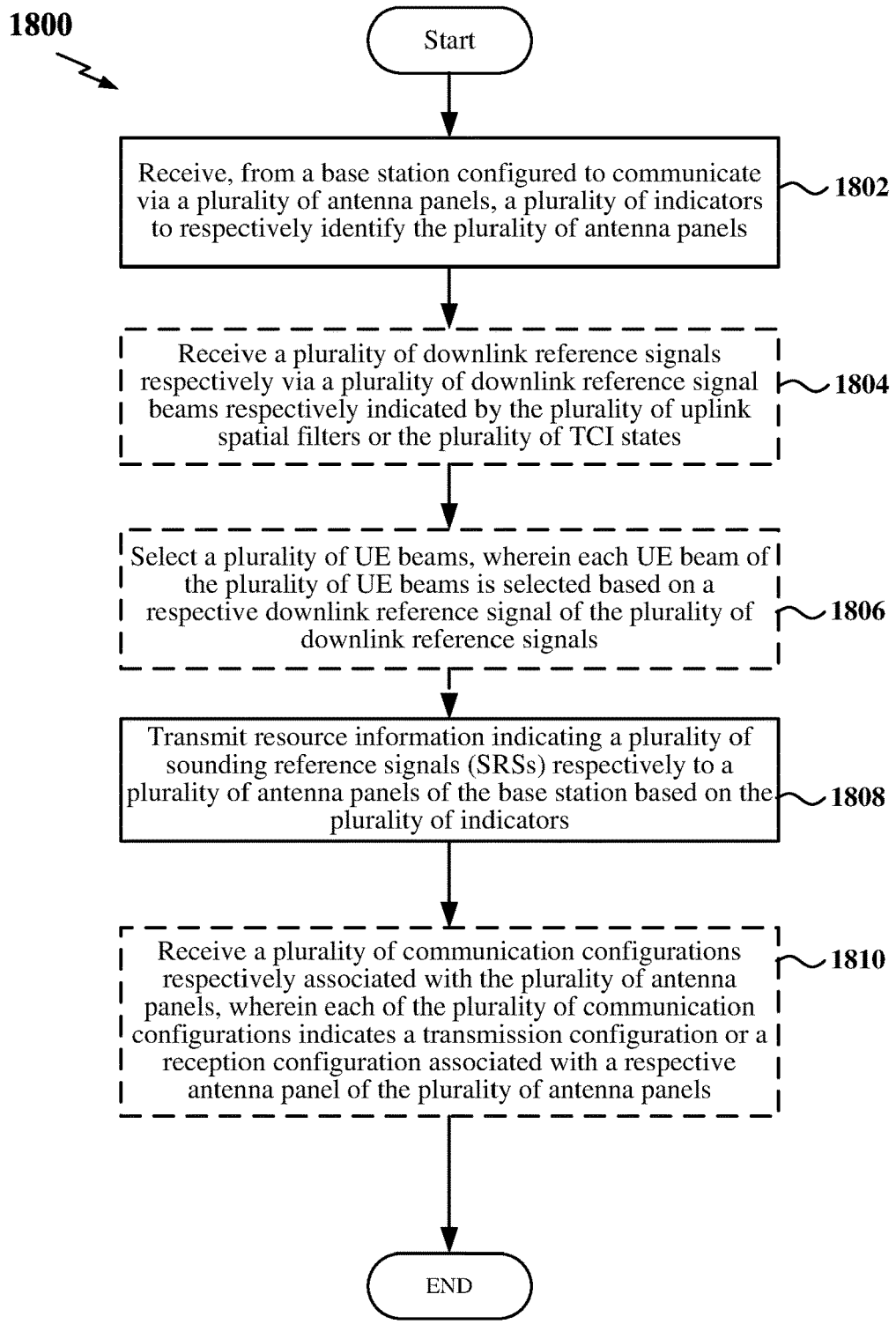
FIG. 18 is a flow chart of an exemplary method for wireless communication by a user equipment according to some aspects.

FIG. 18 is a flow chart 1800 of a method for wireless communication by a UE according to some aspects. As described below, some or all illustrated features may be omitted in a particular implementation within the scope of the present disclosure, and some illustrated features may not be required for implementation of all embodiments. In some examples, the method may be performed by the UE 1600, as described above and illustrated in FIG. 16, by a processor or processing system, or by any suitable means for carrying out the described functions.

At block 1802, the UE may receive, from a base station configured to communicate via a plurality of antenna panels, a plurality of indicators to respectively identify the plurality of antenna panels. For example, the communication management circuitry 1642 shown and described above in connection with FIG. 16 may provide means to receive the plurality of indicators.

In an aspect, receiving the plurality indicators at block 1802 comprises receiving resource information indicating one or more SRS resources from the base station, wherein each SRS resource of the one or more SRS resources is associated with at least one indicator of the plurality of indicators identifying at least one respective antenna panel of the plurality of antenna panels.

In an aspect, the plurality of indicators may include a plurality of panel identifiers respectively identifying the plurality of antenna panels, a plurality of uplink spatial filters respectively corresponding to the plurality of antenna panels, a plurality of transmission configuration indication (TCI) states respectively corresponding to the plurality of antenna panels, or a combination thereof.

At block 1804, the UE may receive a plurality of downlink reference signals respectively via a plurality of downlink reference signal beams respectively indicated by the plurality of uplink spatial filters or the plurality of TCI states. For example, the communication management circuitry 1642 shown and described above in connection with FIG. 16 may provide means to receive the plurality of downlink reference signals.

At block 1806, the UE may select a plurality of UE beams, wherein each UE beam of the plurality of UE beams is selected based on a respective downlink reference signal of the plurality of downlink reference signals. For example, the beam management circuitry 1644 shown and described above in connection with FIG. 16 may provide means to select the plurality of UE beams.

At block 1808, the UE may transmit a plurality of SRSs respectively to a plurality of antenna panels of the base station based on the plurality of indicators. For example, the communication management circuitry 1642 shown and described above in connection with FIG. 16 may provide means to transmit the plurality of SRSs. For example, the communication management circuitry 1642 shown and described above in connection with FIG. 16 may provide means to transmit the plurality of SRSs.

In an aspect, transmitting the plurality of SRSs may include transmitting the plurality of SRSs to the base station on the one or more SRS resources.

In an aspect, the plurality of downlink reference signals may include a plurality of a synchronization signal blocks (SSB), or a plurality of channel state information reference signals (CSI-RSs), or a combination thereof.

In an aspect, the receiving the one or more SRS resources may include receiving an SRS resource configuration of the one or more SRS resources.

In an aspect, the SRS resource configuration may be received via a radio resource control (RRC) message. In an aspect, the one or more SRS resources may be identified for at least one of a codebook usage, a non-codebook usage, antenna switching, beam management, or at least one SRS for positioning. In an aspect, the one or more SRS resources may be identified for at least one of a periodic SRS type, a semi-persistent SRS type, or an aperiodic SRS type.

In an aspect, the SRS resource configuration may be received in response to panel switching in one or more of the plurality of antenna panels. In an aspect, the SRS resource configuration may be received via a message for updating a radio resource control (RRC) configuration. In an aspect, the message for updating the RRC configuration may include a media access control (MAC) control element (CE).

In an aspect, the one or more SRS resources may include a plurality of SRS resources that are respectively associated with the plurality of panel identifiers, or the plurality of TCI states, or the plurality of uplink spatial filters, or a combination thereof.

In an aspect, the one or more SRS resources may include at least one SRS resource that is repeatedly used for a plurality of SRS transmissions, each of the plurality of SRS transmissions using the at least one SRS resource associated with a respective indicator of the at least one indicator identifying a respective antenna panel of the plurality of antenna panels.

In an aspect, the one or more SRS resources may include a plurality of SRS resources, each comprising a single respective indicator of the plurality of indicators identifying a single antenna panel of the plurality of antenna panels.

In an aspect, panel switching associated with the plurality of antenna panels may be performed within a cyclic prefix, and one or more SRS resources include a plurality of SRS resources, and successive SRS resources of the plurality of SRS resources associated with different indicators of the plurality of indicators identifying different antenna panels of the plurality of antenna panels are located within consecutive symbols.

In an aspect, panel switching associated with the plurality of antenna panels may be performed within a time duration longer than a cyclic prefix, the one or more SRS resources include a plurality of SRS resources, and successive SRS resources of the plurality of SRS resources associated with different indicators of the plurality of indicators identifying different antenna panels of the plurality of antenna panels are spaced apart by at least one guard symbol. In an aspect, a time gap for panel switching may be determined by a number of the at least one guard symbol and is determined based on at least one of subcarrier spacing or a frequency range.

In an aspect, the plurality of indicators may include a downlink TCI state associated with a downlink channel reception from a first antenna panel of the plurality of antenna panels and at least one of an uplink TCI state or an uplink spatial filter associated with an uplink channel transmission to a second antenna panel of the plurality of antenna panels. In an aspect, the receiving the plurality of indicators may include receiving a single TCI codepoint indicating the downlink TCI state and the at least one of the uplink TCI state or the uplink spatial filter. In an aspect, the receiving the plurality of indicators may include receiving a first TCI codepoint indicating the downlink TCI state and a second TCI codepoint indicating the at least one of the uplink TCI state or the uplink spatial filter.

At block 1810, the UE may receive a plurality of communication configurations respectively associated with the plurality of antenna panels, wherein each of the plurality of communication configurations indicates a transmission configuration or a reception configuration associated with a respective antenna panel of the plurality of antenna panels. For example, the communication management circuitry 1642 shown and described above in connection with FIG. 16 may provide means to receive the plurality of communication configurations.

In an aspect, the plurality of antenna panels may include one or more antenna panels for transmission or reception in a time division duplex (TDD) mode, and the plurality of communication configurations are determined based on the TDD mode. In an aspect, the plurality of antenna panels may include at least one antenna panel for transmission and at least one antenna panel for reception in a full duplex mode, and the plurality of communication configurations are determined based on the full duplex mode.

In one configuration, a UE 1600 includes means for performing the various functions and processes described in relation to FIG. 18. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

In one configuration, the UE 1600 may include means for receiving, from a base station configured to communicate via a plurality of antenna panels, a plurality of indicators to respectively identify the plurality of antenna panels, and means for transmitting a plurality of SRSs respectively to a plurality of antenna panels of the base station based on the plurality of indicators. In an aspect, the UE 1600 may further include means for receiving a plurality of downlink reference signals respectively via a plurality of downlink reference signal beams respectively indicated by the plurality of uplink spatial filters or the plurality of TCI states, and means for selecting a plurality of UE beams, wherein each UE beam of the plurality of UE beams is selected based on a respective downlink reference signal of the plurality of downlink reference signals. In an aspect, the UE 1600 may further include means for receiving a plurality of communication configurations respectively associated with the plurality of antenna panels, wherein each of the plurality of communication configurations indicates a transmission configuration or a reception configuration associated with a respective antenna panel of the plurality of antenna panels.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, 4, 7, and/or 8, and utilizing, for example, the processes and/or algorithms described herein in relation to FIG. 18.

The following provides an overview of several aspects of the present disclosure.

Aspect 1: A method of wireless communication by a base station, comprising: transmit a plurality of indicators identifying a plurality of antenna panels on the base station to a user equipment (UE), wherein each indicator of the plurality of indicators identifies a respective panel of the plurality of antenna panels; and communicating with the UE based on the plurality of indicators of the plurality of antenna panels.

Aspect 2: The method of aspect 1, further comprising: identifying one or more sounding reference signal (SRS) resources, wherein transmitting the plurality of indicators comprises transmitting resource information indicating the one or more SRS resources, each SRS resource of the one or more SRS resources being associated with at least one indicator of the plurality of indicators identifying at least one respective antenna panel of the plurality of antenna panels; and receiving a plurality of SRSs from the UE via the plurality of antenna panels on the one or more SRS resources.

Aspect 3: The method of aspects 1 or 2, wherein the plurality of indicators comprise a plurality of panel identifiers respectively identifying the plurality of antenna panels, a plurality of uplink spatial filters respectively corresponding to the plurality of antenna panels, a plurality of transmission configuration indication (TCI) states respectively corresponding to the plurality of antenna panels, or a combination thereof.

Aspect 4: The method of aspect 3, wherein the plurality of uplink spatial filters respectively indicate a plurality of downlink reference signal beams respectively corresponding to the plurality of antenna panels, and wherein the plurality of TCI states respectively indicate the plurality of downlink reference signal beams respectively corresponding to the plurality of antenna panels.

Aspect 5: The method of aspect 4, wherein the plurality of downlink reference signal beams comprise a plurality of synchronization signal block (SSB) beams or a plurality of channel state information reference signal (CSI-RS) beams.

Aspect 6: The method of any one of aspects 2-5, wherein the transmitting the resource information indicating the one or more SRS resources comprises: transmitting an SRS resource configuration of the one or more SRS resources.

Aspect 7: The method of aspect 6, wherein the one or more SRS resources include a plurality of SRS resources and the SRS resource configuration is associated with an SRS resource set comprising the plurality of SRS resources that are respectively associated with the plurality of antenna panels.

Aspect 8: The method of aspect 6, wherein the SRS resource configuration is transmitted via a radio resource control (RRC) message.

Aspect 9: The method of aspect 8, wherein the identifying the one or more SRS resources comprises: identifying the one or more SRS resources for at least one of a codebook usage, a non-codebook usage, antenna switching, beam management, or at least one SRS for positioning.

Aspect 10: The method of aspect 8, wherein the identifying the one or more SRS resources comprises: identifying the one or more SRS resources for at least one of a periodic SRS type, a semi-persistent SRS type, or an aperiodic SRS type.

Aspect 11: The method of aspect 6, wherein the transmitting the SRS resource configuration comprises: transmitting the SRS resource configuration in response to panel switching of the plurality of antenna panels.

Aspect 12: The method of aspect 11, wherein the SRS resource configuration is transmitted via a message for updating a radio resource control (RRC) configuration.

Aspect 13: The method of aspect 12, wherein the message for updating the RRC configuration includes a media access control (MAC) control element (CE).

Aspect 14: The method of any one of aspects 2-13, wherein the one or more SRS resources include a plurality of SRS resources that are respectively associated with the plurality of panel identifiers, or the plurality of TCI states, or the plurality of uplink spatial filters, or a combination thereof.

Aspect 15: The method of any one of aspects 2-13, wherein the one or more SRS resources include at least one SRS resource that is repeatedly used for a plurality of SRS transmissions, each of the plurality of SRS transmissions using the at least one SRS resource associated with a respective indicator of the at least one indicator identifying a respective antenna panel of the plurality of antenna panels.

Aspect 16: The method of any one of aspects 2-13, wherein the one or more SRS resources include a plurality of SRS resources, each comprising a single respective indicator of the plurality of indicators identifying a single antenna panel of the plurality of antenna panels.

Aspect 17: The method of any one of aspects 2-16, wherein panel switching associated with the plurality of antenna panels is performed within a cyclic prefix, wherein the one or more SRS resources include a plurality of SRS resources, and wherein successive SRS resources of the plurality of SRS resources associated with different indicators of the plurality of indicators identifying different antenna panels of the plurality of antenna panels are located within consecutive symbols.

Aspect 18: The method of any one of aspects 2-16, wherein panel switching associated with the plurality of antenna panels is performed within a time duration longer than a cyclic prefix, wherein the one or more SRS resources include a plurality of SRS resources, and wherein successive SRS resources of the plurality of SRS resources associated with different indicators of the plurality of indicators identifying different antenna panels of the plurality of antenna panels are spaced apart by at least one guard symbol.

Aspect 19: The method of aspect 18, wherein a time gap for panel switching is determined by a number of the at least one guard symbol and is determined based on at least one of subcarrier spacing or a frequency range.

Aspect 20: The method of any one of aspects 1-19, wherein the plurality of indicators include a downlink transmission configuration indication (TCI) state associated with a downlink channel reception from a first antenna panel of the plurality of antenna panels and at least one of an uplink TCI state or an uplink spatial filter associated with an uplink channel transmission to a second antenna panel of the plurality of antenna panels.

Aspect 21: The method of aspect 20, wherein the transmitting the plurality of indicators comprises transmitting a single TCI codepoint indicating the downlink TCI state and at least one of the uplink TCI state or the uplink spatial filter.

Aspect 22: The method of aspect 20, wherein the transmitting the plurality of indicators comprises transmitting a first TCI codepoint indicating the downlink TCI state and a second TCI codepoint indicating at least one of the uplink TCI state or the uplink spatial filter.

Aspect 23: The method of any one of aspects 1-22, further comprising: transmitting a plurality of communication configurations respectively associated with the plurality of antenna panels, wherein each of the plurality of communication configurations indicates a transmission configuration or a reception configuration associated with a respective antenna panel of the plurality of antenna panels.

Aspect 24: The method of aspect 23, wherein the plurality of antenna panels includes one or more antenna panels for transmission or reception in a time division duplex (TDD) mode, and wherein the plurality of communication configurations are determined based on the TDD mode.

Aspect 25: The method of aspect 23, wherein the plurality of antenna panels includes at least one antenna panel for transmission and at least one antenna panel for reception in a full duplex mode, and wherein the plurality of communication configurations are determined based on the full duplex mode.

Aspect 26: A user equipment (UE) comprising: a transceiver configured to communicate with a radio access network, a memory, and a processor communicatively coupled to the transceiver and the memory, wherein the processor and the memory are configured to perform any one of aspects 1 through 25.

Aspect 27: A UE configured for wireless communication comprising at least one means for performing any one of aspects 1 through 25.

Aspect 28: A non-transitory processor-readable storage medium having instructions for a UE thereon, wherein the instructions, when executed by a processing circuit, cause the processing circuit to perform any one of aspects 1 through 25.

Aspect 29: A method of wireless communication by a user equipment (UE), comprising: receiving, from a base station configured to communicate via a plurality of antenna panels, a plurality of indicators to respectively identify the plurality of antenna panels; and transmitting a plurality of sounding reference signals (SRSs) respectively to a plurality of antenna panels of the base station based on the plurality of indicators.

Aspect 30: The method of aspect 29, wherein receiving the plurality indicators comprises receiving resource information indicating one or more sounding reference signal (SRS) resources from the base station, wherein each SRS resource of the one or more SRS resources is associated with at least one indicator of the plurality of indicators identifying at least one respective antenna panel of the plurality of antenna panels, and wherein transmitting the plurality of SRSs comprises transmitting the plurality of SRSs to the base station on the one or more SRS resources.

Aspect 31: The method of aspects 29 or 30, wherein the plurality of indicators comprise a plurality of panel identifiers respectively identifying the plurality of antenna panels, a plurality of uplink spatial filters respectively corresponding to the plurality of antenna panels, a plurality of transmission configuration indication (TCI) states respectively corresponding to the plurality of antenna panels, or a combination thereof.

Aspect 32: The method of aspect 31, further comprising: receiving a plurality of downlink reference signals respectively via a plurality of downlink reference signal beams respectively indicated by the plurality of uplink spatial filters or the plurality of TCI states; and selecting a plurality of UE beams, wherein each UE beam of the plurality of UE beams is selected based on a respective downlink reference signal of the plurality of downlink reference signals, wherein the plurality of SRSs are transmitted respectively using the plurality of UE beams respectively to the plurality of antenna panels.

Aspect 33: The method of aspect 32, wherein the plurality of downlink reference signals include a plurality of a synchronization signal blocks (SSB), or a plurality of channel state information reference signals (CSI-RSs), or a combination thereof.

Aspect 34: The method of any one of aspects 30-33, wherein the receiving the resource information indicating the one or more SRS resources comprises: receiving an SRS resource configuration of the one or more SRS resources.

Aspect 35: The method of aspect 34, wherein the SRS resource configuration is received via a radio resource control (RRC) message.

Aspect 36: The method of aspect 35, wherein the one or more SRS resources are identified for at least one of a codebook usage, a non-codebook usage, antenna switching, beam management, or at least one SRS for positioning.

Aspect 37: The method of aspect 35, wherein the one or more SRS resources are identified for at least one of a periodic SRS type, a semi-persistent SRS type, or an aperiodic SRS type.

Aspect 38: The method of aspect 34, wherein the SRS resource configuration is received in response to panel switching in one or more of the plurality of antenna panels.

Aspect 39: The method of aspect 38, wherein the SRS resource configuration is received via a message for updating a radio resource control (RRC) configuration.

Aspect 40: The method of aspect 39, wherein the message for updating the RRC configuration includes a media access control (MAC) control element (CE).

Aspect 41: The method of any one of aspects 30-40, wherein the one or more SRS resources include a plurality of SRS resources that are respectively associated with the plurality of panel identifiers, or the plurality of TCI states, or the plurality of uplink spatial filters, or a combination thereof.

Aspect 42: The method of any one of aspects 30-41, wherein the one or more SRS resources include at least one SRS resource that is repeatedly used for a plurality of SRS transmissions, each of the plurality of SRS transmissions using the at least one SRS resource associated with a respective indicator of the at least one indicator identifying a respective antenna panel of the plurality of antenna panels.

Aspect 43: The method of any one of aspects 30-41, wherein the one or more SRS resources include a plurality of SRS resources, each comprising a single respective indicator of the plurality of indicators identifying a single antenna panel of the plurality of antenna panels.

Aspect 44: The method of any one of aspects 30-43, wherein panel switching associated with the plurality of antenna panels is performed within a cyclic prefix, and wherein the one or more SRS resources include a plurality of SRS resources, and wherein successive SRS resources of the plurality of SRS resources associated with different indicators of the plurality of indicators identifying different antenna panels of the plurality of antenna panels are located within consecutive symbols.

Aspect 45: The method of any one of aspects 30-43, wherein panel switching associated with the plurality of antenna panels is performed within a time duration longer than a cyclic prefix, wherein the one or more SRS resources include a plurality of SRS resources, and wherein successive SRS resources of the plurality of SRS resources associated with different indicators of the plurality of indicators identifying different antenna panels of the plurality of antenna panels are spaced apart by at least one guard symbol.

Aspect 46: The method of aspect 45, wherein a time gap for panel switching is determined by a number of the at least one guard symbol and is determined based on at least one of subcarrier spacing or a frequency range.

Aspect 47: The method of any one of aspects 29-46, wherein the plurality of indicators include a downlink transmission configuration indication (TCI) state associated with a downlink channel reception from a first antenna panel of the plurality of antenna panels and at least one of an uplink TCI state or an uplink spatial filter associated with an uplink channel transmission to a second antenna panel of the plurality of antenna panels.

Aspect 48: The method of aspect 47, wherein the receiving the plurality of indicators comprises receiving a single TCI codepoint indicating the downlink TCI state and the at least one of the uplink TCI state or the uplink spatial filter.

Aspect 49: The method of aspect 47, wherein the receiving the plurality of indicators comprises receiving a first TCI codepoint indicating the downlink TCI state and a second TCI codepoint indicating the at least one of the uplink TCI state or the uplink spatial filter.

Aspect 50: The method of any one of aspects 29-49, further comprising: receiving a plurality of communication configurations respectively associated with the plurality of antenna panels, wherein each of the plurality of communication configurations indicates a transmission configuration or a reception configuration associated with a respective antenna panel of the plurality of antenna panels.

Aspect 51: The method of aspect 50, wherein the plurality of antenna panels includes one or more antenna panels for transmission or reception in a time division duplex (TDD) mode, wherein the plurality of communication configurations are determined based on the TDD mode.

Aspect 52: The method of aspect 50, wherein the plurality of antenna panels includes at least one antenna panel for transmission and at least one antenna panel for reception in a full duplex mode, wherein the plurality of communication configurations are determined based on the full duplex mode.

Aspect 53: A user equipment (UE) comprising: a transceiver configured to communicate with a radio access network, a memory, and a processor communicatively coupled to the transceiver and the memory, wherein the processor and the memory are configured to perform any one of aspects 29 through 52.

Aspect 54: A UE configured for wireless communication comprising at least one means for performing any one of aspects 29 through 52.

Aspect 55: A non-transitory processor-readable storage medium having instructions for a UE thereon, wherein the instructions, when executed by a processing circuit, cause the processing circuit to perform any one of aspects 29 through 52. Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5A, 6, 9, 10, 12, 13, and 16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A base station for wireless communication, comprising:
at least one processor;
a transceiver communicatively coupled to the at least one processor; and
a memory communicatively coupled to the at least one processor,
wherein the at least one processor is configured to:
transmit a plurality of indicators identifying a plurality of antenna panels on the base station to a user equipment (UE), wherein each indicator of the plurality of indicators identifies a respective panel of the plurality of antenna panels of the base station;
communicate with the UE based on the plurality of indicators of the plurality of antenna panels;
identify one or more sounding reference signal (SRS) resources, wherein transmitting the plurality of indicators comprises transmitting resource information indicating the one or more SRS resources, each SRS resource of the one or more SRS resources being associated with at least one indicator of the plurality of indicators identifying at least one respective antenna panel of the plurality of antenna panels; and
receive a plurality of sounding reference signals (SRSs) from the UE via the plurality of antenna panels on the one or more SRS resources.

2. The base station of claim 1, wherein the at least one processor configured to transmit the resource information indicating the one or more SRS resources is configured to:
transmit an SRS resource configuration of the one or more SRS resources.

3. The base station of claim 2, wherein the one or more SRS resources include a plurality of SRS resources and the SRS resource configuration is associated with an SRS resource set comprising the plurality of SRS resources that are respectively associated with the plurality of antenna panels.

4. The base station of claim 2, wherein the at least one processor configured to transmit the SRS resource configuration is configured to:
transmit the SRS resource configuration in response to panel switching of the plurality of antenna panels.

5. The base station of claim 1, wherein the one or more SRS resources include at least one SRS resource that is repeatedly used for a plurality of SRS transmissions, each of the plurality of SRS transmissions using the at least one SRS resource associated with a respective indicator of the at least one indicator identifying a respective antenna panel of the plurality of antenna panels.

6. The base station of claim 1, wherein the one or more SRS resources include a plurality of SRS resources, each comprising a single respective indicator of the plurality of indicators identifying a single antenna panel of the plurality of antenna panels.

7. The base station of claim 1, wherein:
panel switching associated with the plurality of antenna panels is performed within a cyclic prefix,
the one or more SRS resources include a plurality of SRS resources, and
successive SRS resources of the plurality of SRS resources associated with different indicators of the plurality of indicators identifying different antenna panels of the plurality of antenna panels are located within consecutive symbols.

8. The base station of claim 1, wherein:
panel switching associated with the plurality of antenna panels is performed within a time duration longer than a cyclic prefix,
the one or more SRS resources include a plurality of SRS resources, and
successive SRS resources of the plurality of SRS resources associated with different indicators of the plurality of indicators identifying different antenna panels of the plurality of antenna panels are spaced apart by at least one guard symbol.

9. The base station of claim 8, wherein a time gap for the panel switching is determined by a number of the at least one guard symbol and is determined based on at least one of subcarrier spacing or a frequency range.

10. The base station of claim 1, wherein the plurality of indicators include a downlink transmission configuration indication (TCI) state associated with a downlink channel reception from a first antenna panel of the plurality of antenna panels and at least one of an uplink TCI state or an uplink spatial filter associated with an uplink channel transmission to a second antenna panel of the plurality of antenna panels.

11. The base station of claim 10, wherein the at least one processor configured to transmit the plurality of indicators is configured to:
transmit a single TCI codepoint indicating the downlink TCI state and at least one of the uplink TCI state or the uplink spatial filter, or
transmit a first TCI codepoint indicating the downlink TCI state and a second TCI codepoint indicating at least one of the uplink TCI state or the uplink spatial filter.

12. The base station of claim 1, wherein the at least one processor is further configured to:
transmit a plurality of communication configurations respectively associated with the plurality of antenna panels, wherein each of the plurality of communication configurations indicates a transmission configuration or a reception configuration associated with a respective antenna panel of the plurality of antenna panels.

13. The base station of claim 12, wherein the plurality of antenna panels includes one or more antenna panels for transmission or reception in a time division duplex (TDD) mode, and
wherein the plurality of communication configurations are determined based on the TDD mode.

14. The base station of claim 12, wherein the plurality of antenna panels includes at least one antenna panel for transmission and at least one antenna panel for reception in a full duplex mode, and
wherein the plurality of communication configurations are determined based on the full duplex mode.

15. A method of wireless communication by a base station, comprising:
transmitting a plurality of indicators identifying a plurality of antenna panels on the base station to a user equipment (UE), wherein each indicator of the plurality of indicators identifies a respective panel of the plurality of antenna panels of the base station;
communicating with the UE based on the plurality of indicators of the plurality of antenna panels,
identifying one or more sounding reference signal (SRS) resources, wherein transmitting the plurality of indicators comprises transmitting resource information indicating the one or more SRS resources, each SRS resource of the one or more SRS resources being associated with at least one indicator of the plurality of indicators identifying at least one respective antenna panel of the plurality of antenna panels; and
receiving a plurality of sounding reference signals (SRSs) from the UE via the plurality of antenna panels on the one or more SRS resources.

16. A user equipment (UE) for wireless communication, comprising:
at least one processor;
a transceiver communicatively coupled to the at least one processor; and
a memory communicatively coupled to the at least one processor,
wherein the at least one processor is configured to:
receive, from a base station configured to communicate via a plurality of antenna panels, a plurality of indicators to respectively identify the plurality of antenna panels of the base station; and
transmit a plurality of sounding reference signals (SRSs) respectively to the plurality of antenna panels of the base station based on the plurality of indicators,
wherein the at least one processor configured to receive the plurality of indicators is configured to receive resource information indicating one or more sounding reference signal (SRS) resources from the base station, wherein each SRS resource of the one or more SRS resources is associated with at least one indicator of the plurality of indicators identifying at least one respective antenna panel of the plurality of antenna panels, and
wherein the at least one processor configured to transmit the plurality of SRSs is configured to transmit the plurality of SRSs to the base station on the one or more SRS resources.

17. The UE of claim 16, wherein the at least one processor is further configured to:

receive a plurality of downlink reference signals respectively via a plurality of downlink reference signal beams respectively indicated by a plurality of uplink spatial filters respectively corresponding to the plurality of antenna panels or a plurality of transmission configuration indication (TCI) states respectively corresponding to the plurality of antenna panels, the plurality of indicators comprising the plurality of uplink spatial filters and/or the plurality of TCI states; and select a plurality of UE beams, wherein each UE beam of the plurality of UE beams is selected based on a respective downlink reference signal of the plurality of downlink reference signals, wherein the plurality of SRSs are transmitted respectively using the plurality of UE beams respectively to the plurality of antenna panels.

18. The UE of claim 16, wherein the at least one processor configured to receive the resource information indicating the one or more SRS resources is configured to:

receive an SRS resource configuration of the one or more SRS resources.

19. The UE of claim 18, wherein the SRS resource configuration is received in response to panel switching in one or more of the plurality of antenna panels.

20. The UE of claim 16, wherein the one or more SRS resources include at least one SRS resource that is repeatedly used for a plurality of SRS transmissions, each of the plurality of SRS transmissions using the at least one SRS resource associated with a respective indicator of the at least one indicator identifying a respective antenna panel of the plurality of antenna panels.

21. The UE of claim 16, wherein the one or more SRS resources include a plurality of SRS resources, each comprising a single respective indicator of the plurality of indicators identifying a single antenna panel of the plurality of antenna panels.

22. The UE of claim 16, wherein:

panel switching associated with the plurality of antenna panels is performed within a cyclic prefix, the one or more SRS resources include a plurality of SRS resources, and successive SRS resources of the plurality of SRS resources associated with different indicators of the plurality of indicators identifying different antenna panels of the plurality of antenna panels are located within consecutive symbols.

23. The UE of claim 16, wherein:

panel switching associated with the plurality of antenna panels is performed within a time duration longer than a cyclic prefix, the one or more SRS resources include a plurality of SRS resources, and successive SRS resources of the plurality of SRS resources associated with different indicators of the plurality of indicators identifying different antenna panels of the plurality of antenna panels are spaced apart by at least one guard symbol.

24. The UE of claim 23, wherein a time gap for panel switching is determined by a number of the at least one guard symbol and is determined based on at least one of subcarrier spacing or a frequency range.

25. The UE of claim 16, wherein the plurality of indicators include a downlink transmission configuration indication (TCI) state associated with a downlink channel reception from a first antenna panel of the plurality of antenna panels and at least one of an uplink TCI state or an uplink spatial filter associated with an uplink channel transmission to a second antenna panel of the plurality of antenna panels.

26. The UE of claim 25, wherein the at least one processor configured to receive the plurality of indicators is configured to receive a single TCI codepoint indicating the downlink TCI state and the at least one of the uplink TCI state or the uplink spatial filter, or wherein the at least one processor configured to receive the plurality of indicators is configured to receive a first TCI codepoint indicating the downlink TCI state and a second TCI codepoint indicating the at least one of the uplink TCI state or the uplink spatial filter.

27. The UE of claim 16, wherein the at least one processor is further configured to:

receive a plurality of communication configurations respectively associated with the plurality of antenna panels, wherein each of the plurality of communication configurations indicates a transmission configuration or a reception configuration associated with a respective antenna panel of the plurality of antenna panels.

28. A method of wireless communication by a user equipment (UE), comprising:

receiving, from a base station configured to communicate via a plurality of antenna panels, a plurality of indicators to respectively identify the plurality of antenna panels of the base station;

transmitting a plurality of sounding reference signals (SRSs) respectively to the plurality of antenna panels of the base station based on the plurality of indicators, wherein said receiving the plurality of indicators includes receiving resource information indicating one or more sounding reference signal (SRS) resources from the base station, wherein each SRS resource of the one or more SRS resources is associated with at least one indicator of the plurality of indicators identifying at least one respective antenna panel of the plurality of antenna panels, and wherein said transmitting the plurality of SRSs includes transmitting the plurality of SRSs to the base station on the one or more SRS resources.

* * * * *